United States Patent
Chu et al.

(10) Patent No.: US 11,010,727 B2
(45) Date of Patent: May 18, 2021

(54) PRESENTING PREVIOUSLY HIDDEN USER INTERFACE OPTIONS WITHIN A GRAPHICAL USER INTERFACE

(71) Applicant: PayPal, Inc., San Jose, CA (US)

(72) Inventors: Peter Zhe Chu, Santa Clara, CA (US); Steven Chen, San Jose, CA (US); Franck Chastagnol, Redwood City, CA (US); Aaron Kwong Yue Lee, San Francisco, CA (US); Hugo Olliphant, San Francisco, CA (US); Wendy Billman, Council Bluffs, IA (US)

(73) Assignee: PayPal, Inc., San Jose, CA (US)

( * ) Notice: Subject to any disclaimer, the term of this patent is extended or adjusted under 35 U.S.C. 154(b) by 808 days.

(21) Appl. No.: 14/879,480

(22) Filed: Oct. 9, 2015

(65) Prior Publication Data
US 2016/0132842 A1    May 12, 2016

Related U.S. Application Data

(63) Continuation of application No. 10/976,170, filed on Oct. 27, 2004, now abandoned.
(Continued)

(51) Int. Cl.
*G06Q 20/04* (2012.01)
*G06Q 30/02* (2012.01)
(Continued)

(52) U.S. Cl.
CPC ....... *G06Q 20/0457* (2013.01); *G06F 3/0482* (2013.01); *G06F 3/04842* (2013.01);
(Continued)

(58) Field of Classification Search
CPC .............. G06F 3/0482; G06Q 20/0457; G06Q 30/0207
See application file for complete search history.

(56) References Cited

U.S. PATENT DOCUMENTS

| 6,175,823 | B1 | 1/2001 | Van Dusen |
| 6,370,514 | B1 | 4/2002 | Messner |

(Continued)

FOREIGN PATENT DOCUMENTS

| WO | WO-0016227 | 3/2000 |
| WO | WO-0070496 | 11/2000 |
| WO | WO-02075628 | 9/2002 |

OTHER PUBLICATIONS

Business Editors & Retail/High-Tech Writers. (Jul. 27, 1999). Retail store systems announces an electronic gift certificate payment system for the IBM AS/400. Business Wire Retrieved from (Year: 1999).*

(Continued)

*Primary Examiner* — John Van Bramer
*Assistant Examiner* — Darnell A Pouncil

(57) ABSTRACT

A system and method to associate an electronic gift certificate with a payment services account to cause presentation of the electronic gift certificate based on meeting a predetermined condition. A gift certificate is purchased on-line and associated with a recipient's payment services account by the electronic gift certificate purchaser. A graphical user interface representing the payment services account of the recipient is presented with a record of the electronic gift certificate in a hidden state within the payment services account. Determining the predetermined condition is met, unmarking the record of the electronic gift certificate and causing presentation of a gift certificate button within the user interface representing the payment services account.

16 Claims, 12 Drawing Sheets

Related U.S. Application Data

(60) Provisional application No. 60/515,046, filed on Oct. 27, 2003.

(51) Int. Cl.
  G06F 40/134 (2020.01)
  G06F 3/0482 (2013.01)
  G06F 3/0484 (2013.01)

(52) U.S. Cl.
  CPC ........... *G06F 40/134* (2020.01); *G06Q 30/02* (2013.01); *G06Q 30/0207* (2013.01); *G06Q 30/0241* (2013.01)

(56) References Cited

U.S. PATENT DOCUMENTS

| | | | |
|---|---|---|---|
| 6,594,644 | B1 | 7/2003 | Van Dusen |
| 7,010,512 | B1 | 3/2006 | Gillin et al. |
| 7,134,087 | B2 | 11/2006 | Bushold et al. |
| 7,512,552 | B2 * | 3/2009 | Karas .................. G06Q 10/101 705/14.27 |
| 2002/0042744 | A1 | 4/2002 | Kohl |
| 2002/0032605 | A1 | 7/2002 | Lee |
| 2002/0116253 | A1 | 8/2002 | Coyne et al. |
| 2002/0129108 | A1 | 9/2002 | Sykes, Jr. |
| 2002/0138366 | A1 | 9/2002 | Skantze |
| 2003/0187792 | A1 | 10/2003 | Hansen et al. |
| 2003/0195838 | A1 | 10/2003 | Henley |
| 2004/0117247 | A1 | 6/2004 | Agrawal et al. |
| 2004/0181452 | A1 | 9/2004 | DeLaCruz |
| 2004/0249753 | A1 * | 12/2004 | Blinn .................... G06Q 20/10 705/41 |
| 2005/0165698 | A1 | 7/2005 | Cho et al. |
| 2005/0197919 | A1 | 9/2005 | Robertson |
| 2006/0168004 | A1 | 7/2006 | Choe et al. |
| 2009/0204523 | A1 | 8/2009 | May et al. |

OTHER PUBLICATIONS

"", www.rbplumbing.com/index2.html web.archive.org/web/20011115111809/listings.ebay.com/aw/listings/list/all/category19272/index.html web.archive.org/web/2001 021 0004215/www.haggle.com/cache/cat31.html, (Nov. 15, 2001).
"U.S. Appl. No. 10/976,170, Advisory Action dated Oct. 31, 2013", 3 pgs.
"U.S. Appl. No. 10/976,170, Examiner Interview Summary dated Mar. 25, 2015", 3 pgs.
"U.S. Appl. No. 10/976,170, Final Office Action dated Apr. 10, 2015", 31 pgs.
"U.S. Appl. No. 10/976,170, Final Office Action dated Aug. 2, 2013", 21 pgs.
"U.S. Appl. No. 10/976,170, Final Office Action dated Sep. 10, 2010", 18 pgs.
"U.S. Appl. No. 10/976,170, Final Office Action dated Nov. 12, 2009", 15 pgs.
"U.S. Appl. No. 10/976,170, Non Final Office Action dated Mar. 28, 2014", 23 pgs.
"U.S. Appl. No. 10/976,170, Non Final Office Action dated Nov. 21, 2014", 26 pgs.
"U.S. Appl. No. 10/976,170, Non Final Office Action dated Nov. 23, 2012", 22 pgs.
"U.S. Appl. No. 10/976,170, Non-Final Office Action dated Mar. 4, 2010", 16 pgs.
"U.S. Appl. No. 10/976,170, Non-Final Office Action dated Apr. 3, 2009", 18 pgs.
"U.S. Appl. No. 10/976,170, Response filed Jan. 10, 2011 to Final Office Action dated Sep. 10, 2010", 16 pgs.
"U.S. Appl. No. 10/976,170, Response filed Feb. 10, 2010 to Final Office Action dated Nov. 12, 2009", 11 pgs.
"U.S. Appl. No. 10/976,170, Response filed Mar. 23, 2015 to Non Final Office Action dated Nov. 21, 2014", 39 pgs.
"U.S. Appl. No. 10/976,170, Response filed Mar. 25, 2013 to Non Final Office Action dated Nov. 23, 2012", 14 pgs.
"U.S. Appl. No. 10/976,170, Response filed Jun. 4, 2010 to Non Final Office Action dated Mar. 4, 2010", 15 pgs.
"U.S. Appl. No. 10/976,170, Response filed Jul. 6, 2009 to Non Final Office Action dated Apr. 3, 2009", 13 pgs.
"U.S. Appl. No. 10/976,170, Response filed Jul. 28, 2014 to Non Final Office Action dated Mar. 28, 2014", 16 pgs.
"U.S. Appl. No. 10/976,170, Response filed Oct. 2, 2013 to Final Office Action dated Aug. 2, 2013", 14 pgs.
"U.S. Appl. No. 10/976,170, Response filed Dec. 2, 2013 to Final Office Action dated Aug. 2, 2013", 15 pgs.
Brain, M., "How UPC Bar Codes Work", Howstuffworks, [Online]. Retrieved from the Internet: <URL: web.archive.org/web/20030801 0731 05/electronics.howstuffworks.com/upc2.htm>, (Oct. 8, 2003).
Yahoo, "Gift Certificates Guidelines", http://help.yahoo.com/help/us/store/manage/ordersettings/ordersettings-47.html, (2004), Web Page.
Yahoo, "How do I use a Yahoo! Store gift certificate?", http://help.yahoo.com/help/us/store/store-21.html, (2004), Web Page.

* cited by examiner

PRESENTING PREVIOUSLY HIDDEN USER INTERFACE OPTIONS WITHIN A GRAPHICAL USER INTERFACE

This application claims the priority benefits of U.S. Provisional Application No. 60/515,046, filed Oct. 27, 2003, which is incorporated herein by reference, and U.S. patent application Ser. No. 10/976,170, filed Oct. 27, 2004, which is incorporated herein by reference.

TECHNICAL FIELD

The subject matter disclosed herein generally relates to generating a graphical user interface and, more specifically, to present previously hidden user interface options upon meeting a predetermined condition.

BACKGROUND

Electronic commerce that utilizes the Internet to sell goods and services to customers has been increasing in its scope and scale at increasing rates. Merchants using the Internet to increase sales of goods and services are attempting to become as sophisticated in the techniques used to increase sales as more traditional sales in stores. The on-line techniques are now utilizing well known sales devices such as coupons, gift certificates and related sales devices to increase sales, create customer loyalty to an on-line merchant, and provide customers with an on-line buying experience similar to buying experiences customers experience at stores and shopping malls.

On-line sales of goods and services, however, possess a different set of challenges associated with conducting sales transactions between a merchant and a customer that never meet. Specifically, challenges exist to ensure a merchant and a customer can obtain confidence that the identity of each party is sufficiently known to permit a legal transaction for the sale of goods to occur. Because communications between merchant's commerce servers and customer client computers occur using transfer of data between IP addresses over the Internet, and because these IP addresses are not necessary static nor are they readily known to the parties, authenticating the identity of each parties requires more effort than is needed when a customer sets foot into a store. In a store, a merchant may request identification if desired prior to completion of a sale. On-line transactions are unable to rely on the process used by an in-store merchant to verify identity of the buyer and/or seller.

Additionally, on-line transactions permit electronic transfer of payment information between merchant and customer computers in which this payment information may temporarily reside within intermediate computing systems. This temporary storage of the information increases chances that the information may be improperly intercepted. Improperly intercepted payment information may result in attempts to fraudulently obtain the purchase of goods using this intercepted information. Payment information related to banking information and credit card account usage already possess anti-fraud mechanisms to detect, to deter, and to prevent such fraudulent activities. Banking institutions and credit card companies continually develop increasing sophisticated mechanisms that relieve on-line merchants of much of the need to develop and deploy their own complex anti-fraud mechanisms. On-line merchants may rely upon these banking institutions to respond to increase sophistication of on-line fraudulent behavior.

Payment mechanism such as gift certificates, however, place these anti-fraud obligations upon merchants that utilize these sales devices. In the use of these devices, on-line merchants and their payment service partners need to provide the customer identity authentication mechanisms in order for these sales devices to be successful. Typically, the gift certificate sales devices used on-line have utilized unique redemption codes that appear as a random sequence of characters that are provided by a customer when the gift certificate is redeemed. An assumption is made that care has been exercised by customers in the transmittal of the gift certificate. As such, the redemption code used by on-line merchants to authenticate and identify a gift certificate is also assumed to be protected by a customer. However, customers of the on-line merchant and their corresponding recipients of gift certificates may become irate when a gift certificate is not honored by an on-line merchant when it has been fraudulently redeemed after improper interception of the information needed for redemption. On-line merchants face an undesirable choice to create two or more dissatisfied customers from the denial of a second redemption of the gift certificate, to honor a gift certificate multiple times and simply bear the added costs, or to not utilize sales devices such as gift certificates that customers typically expect to be available and that have been shown to increase sales activities for merchants utilizing them.

These limitations of existing on-line gift certificate mechanisms that utilize only a unique and random redemption code have hampered their widespread adoption and have resulted in lost profits for on-line merchants. New on-line mechanisms to sell, transfer, and redeem these sales devices may result in on-line merchants overcoming these limitations in existing on-line sales devices and thus increase on-line sales and corresponding profits for these merchants.

SUMMARY

The below described embodiments of the present invention are directed to methods and systems to associate a gift certificate with an email address. According to one embodiment, there is provided a system for providing electronic gift certificates for use in completion of sale of goods and services. The system includes a commerce server module for creation of an order for sale of goods and services and a payment server module for providing payment for the order. The payment server module includes a gift certificate purchase module for sale of an electronic gift certificate associated with an e-mail address of a gift certificate recipient and a gift certificate redemption module redemption of the electronic gift certificate associated with the e-mail address of the gift certificate recipient to provide payment for the order. The identity of the recipient of the gift certificate is authenticated using confirmation information transmitted to the recipient of the gift certificate within an e-mail message that is returned to the payment server module.

In another embodiment, there is provided a method for providing electronic gift certificates for use in completion of sale and order of goods and services. The method sends an e-mail message containing an electronic gift certificate to a recipient e-mail address, receives information specifying the order for goods and services from the recipient, and redeems the electronic gift certificate to pay for the order for goods and services. The recipient of the gift certificate is authenticated to authorize redemption of the gift certificate upon return of confirmation data sent to the recipient e-mail address.

In yet another embodiment, there is provided a system for providing electronic gift certificates for use in completion of sale and order of goods and services. The system includes a means for sending an e-mail message containing an electronic gift certificate to a recipient e-mail address, a means for receiving information specifying the order for goods and services from the recipient. and a means for redeeming the electronic gift certificate to pay for the order for goods and services. The means for redeeming the electronic gift certificate includes a means for selecting a gift certificate for use as a payment source and a means for verifying the recipient is authorized to use the selected gift certificate.

The details of one or more embodiments of the invention are set forth in the accompanying drawings and the description below. Other features, objects, and advantages of the invention will be apparent from the description and drawings, and from the claims.

DETAILED DESCRIPTION

A method and system to associate a gift certificate with an email address are described. In the following description, for purposes of explanation, numerous specific details are set forth in order to provide a thorough understanding of the present invention. It will be evident, however, to one skilled in the art that the present invention may be practiced without these specific details.

Figure 1:
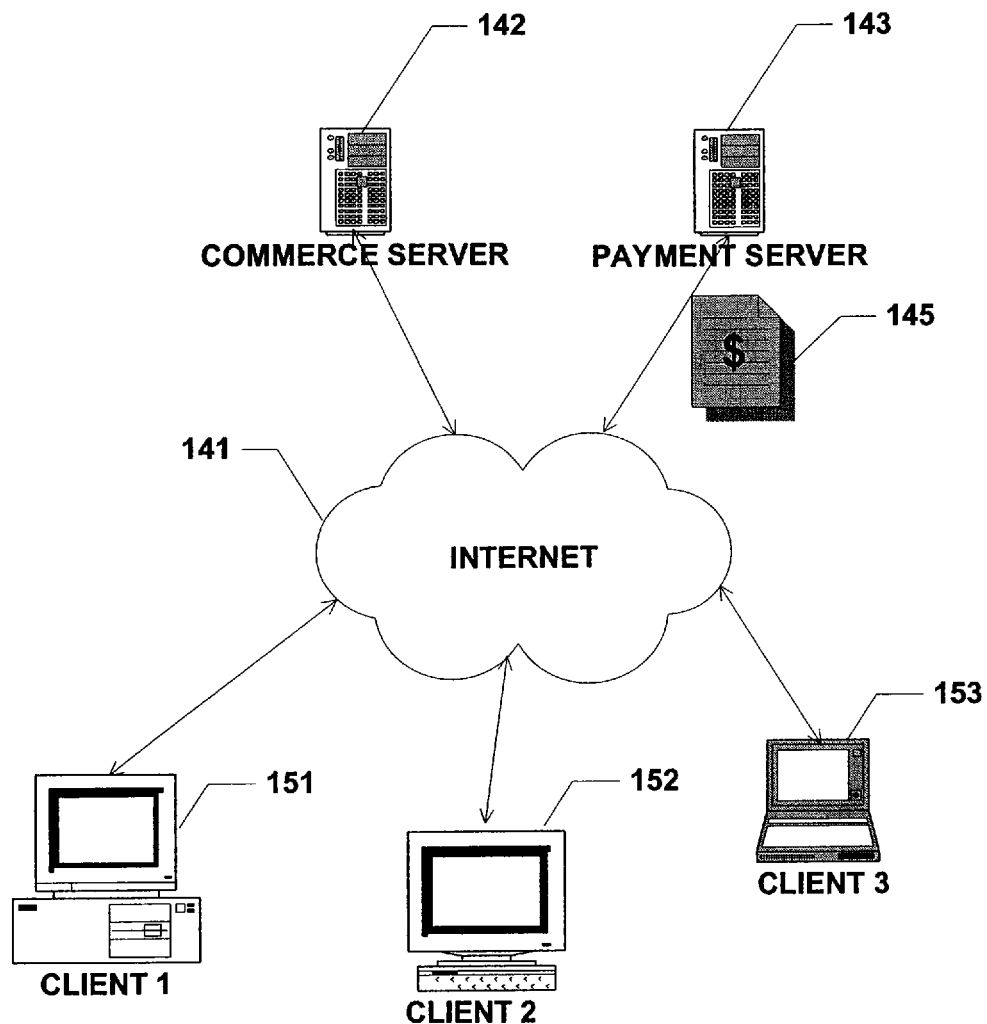
FIG. 1 is a network diagram depicting a system having a client-server architecture in accordance with one exemplary embodiment of the present invention.

FIG. 1 is a network diagram depicting a system having a client-server architecture in accordance with one exemplary embodiment of the present invention. Users of client computers 151-153 interact with servers 142-143 over the Internet 141 to purchase goods and services. In one exemplary embodiment, a user of client 151 interacts with commerce server 142 to purchase one or more items. Client 151 communicates with commerce server 142 by requesting and exchanging documents in well know HTML format. Client 151 permits its user to select items for purchase that are saved within an electronic shopping cart maintained within commerce server 142. When the user completes the transaction, commerce server 142 directs client 151 to interact with payment server 143 to arrange payment for the purchased goods. Client 151 interacts with payment server 143 by requesting and exchanging documents in well know HTML format to provide payment information to be used to transfer monies to the seller of the goods as part of the transaction.

In one exemplary embodiment, user of client 151 uses a gift certificate 145 having a monetary value as the source of funds used in completing the transaction. Gift certificate 145 is maintained within payment server 143 in an account associated with the user of client 151. When the user of client 151 completes a transaction by making a payment using payment server 143, the user logs into payment server 143 and selects an existing gift certificate 145 for use as the funding source for this transaction. If the value of gift certificate 145 is sufficient to pay for the transaction, payment server 143 completes the transaction by transferring monies associated with gift certificate 145 from the user of client 151 account to the account of the seller. Any remaining balance left on the gift certificate may remain for later use.

In this exemplary embodiment, gift certificate 145 is typically purchased by a user of a client 152 and provided to the user of client 151 as is typically done when gift certificates are sold. User of client 152 interacts with payment server 143 to purchase gift certificate 145 and provide an identity of its recipient, user of client 151. In purchasing gift certificate 145, user of client 152, provides an identity of user of client 151, a monetary amount to be provided as part of gift certificate 145, an identity of the merchant accepting gift certificate 145 for redemption, and payment information describing where payment server 143 may obtain the funds for use in purchasing gift certificate 145. The identity of user of client 151 may be an e-mail address usable over the Internet 141 that is unique to user of client 1 151. In other embodiments of present invention, the identity of a user of a client 151 may be recorded using some other communications identifier, such as an SMS address, an instant message (IM) address or a telephone or network address identifier.

Gift certificate 145 is purchased by user of client 152 in a well known manner for purchasing goods over the Internet 141 using, for example, a electronic shopping cart and checkout procedure. The identity of the merchant accepting gift certificate 145 for redemption is associated with commerce server 142 in this embodiment.

User of client 152 purchases gift certificate 145 using a link on a web page provided by commerce server 142 that transfers client 152 to payment server 143 with a data ID identifying commerce server 142 as the source server for a gift certificate purchase request made by client 152. Payment server 143 encodes the data ID identifying commerce server 142 within gift certificate 145 for use when gift certificate 145 is redeemed. Payment server 143 may use this data ID to require gift certificate 145 to be used only for completion of transactions associated with commerce server 142. In an alternate embodiment, commerce server 142 and payment server 143 may reside on a single server or on a collection of servers operated by a single merchant, or similar single entity. In this alternate embodiment, the data ID may not be utilized as gift certificate 145 may only be maintained and used within the servers of this single entity.

When user of client 152 purchases gift certificate 145 with an intention of providing gift certificate 145 to user of client 151, an e-mail is transmitted to the e-mail address for user of client 151 provided to payment server 143 when gift certificate 145 is purchased. This e-mail informs user of client 151 of the existence of gift certificate 145, its value, and the merchant where gift certificate 145 may be redeemed. Using this process, gift certificate 145 is associated with a particular e-mail address, as an example of a communications identifier, that is used when the gift certificate is redeemed. Since an assumption is made that the provided e-mail address is owned by user of client 151, the user may retrieve the e-mail message announcing the arrival of gift certificate 145. Gift certificate 145 remains within a payment service account maintained within payment server 143 that is associated with the provided e-mail address. When user of client 151 wishes to redeem gift certificate, the user logs into payment server 143 using the e-mail address associated with gift certificate 145 when payment for goods is to be provided. When user of client 151 logs into this account, payment server 143 recognizes the existence of gift certificate 145 associated with this user account, permitting its use in completing the transaction. Payment server 143 authenticates user of client 151 when gift certificate 145 is redeemed by requiring confirmation of the user using information contained only within the e-mail message sent to the e-mail account associated with gift certificate 145 to ensure that user of client 151 received the e-mail address and thus is the rightful owner of gift certificate 145.

In one particular embodiment, commerce server 142 provides on-line auction and fixed price setting services for users of clients over the Internet 141. In this embodiment, the goods and services purchased by user of client 151 may be provided by a user of client 153 who posted an item for on-line auction on commerce server 142. Monies obtained by payment server 143 used to complete a transaction for an item sold using an on-line auction are transferred into an account on payment server 143 associated with an e-mail address owned by user of client 153. Typically, user of client 153 sets up a payment account on payment server 143 prior to and/or concurrently with listing of an item sold at auction on commerce server 142. User of client 153 provides an e-mail address uniquely owned by the user that may be used by payment server to identify the user for all transactions within payment server 143. In many cases, this e-mail address may be identical to an e-mail address used as an auction service account identifier within commerce server 142 when items are listed for sale. Because a payment service account exists within payment server 143 for user of client 153, redemption of gift certificate 145 permits payment server to transfer monies into the payment service account associated with user of client 153. Once the funds are placed into this account, user of client 153 may utilize these funds as desired, such as use for payment for items purchased using payment server 143 and for transfer to a bank account owned by user of client 153.

In one exemplary embodiment, the present invention may be adapted for the market for corporate incentives. This slightly tailored solution may involve transferable gift certificates. In a further exemplary embodiment, the present invention may be adapted for the merchant-specific gift certificates. In yet another exemplary embodiment, the payment service merchants may be enabled to offer their own gift certificate programs.

The commerce platform gift certificate capability may be used as an additional tool to drive auction volume both in terms of higher closing prices and an increased number of successfully closed auctions, as well as to potentially acquire new customers since gift certificates may introduce new parties to the commerce platform community.

The commerce platform gift certificates ("GCs") can be purchased by a payment service user, may be given to anyone with a communications identifier (e.g., an email address), and redeemed with a commerce platform seller that accepts payment through the payment service. In one exemplary embodiment of the present invention, some geographic restrictions may be implemented. For example, GCs may be available only through the commerce platform web site with a top level domain ".com" (as opposed to, e.g., ".uk" or ".de"). International GC purchasers can use the GC purchase flows on the US site, which allows international users to click a link and fill out a non-US credit card form.

Recipients may have any email address, including international domains. Recipients may be directed to a domestic commerce platform site, as well as being enabled to navigate to an international site on their own. A recipient using the commerce platform checkout flow on a localized payment service site (for example, a ".uk" site), may be offered the same options to add a gift certificate as they would see on a domestic payment service site.

GCs may be redeemed with the commerce server, which then credits the recipient's account with the appropriate currency, and uses the funds to pay the seller. Sellers are not necessarily aware that a gift certificate has been used for the purchase of their item.

GCs are not restricted to the purchase of items being sold by sellers with domestic payment service accounts. A GC may also be used to purchase an item from a foreign seller. In one exemplary embodiment, escheatment and maintenance fees for foreign recipients may be treated the same way as for Delaware residents.

The table 1 below represents a possibility of enabling various groups of users to use the commerce platform gift certificates.

TABLE 1

Groups Using Gift Certificates.

|  | US | UK | ROW (rest of world) |
|---|---|---|---|
| All user groups | Y | Y | Y |

TABLE 1-continued

Groups Using Gift Certificates.

|  | US | UK | ROW (rest of world) |
|---|---|---|---|
| Personal Accounts | Y | Y | Y |
| Premier Accounts | Y | Y | Y |
| Business Accounts | Y | Y | Y |
| Admin Users | Y | Y | Y |
| Attack Users | N | N | N |
| Others |  |  |  |

Platform Architecture

Figure 2:
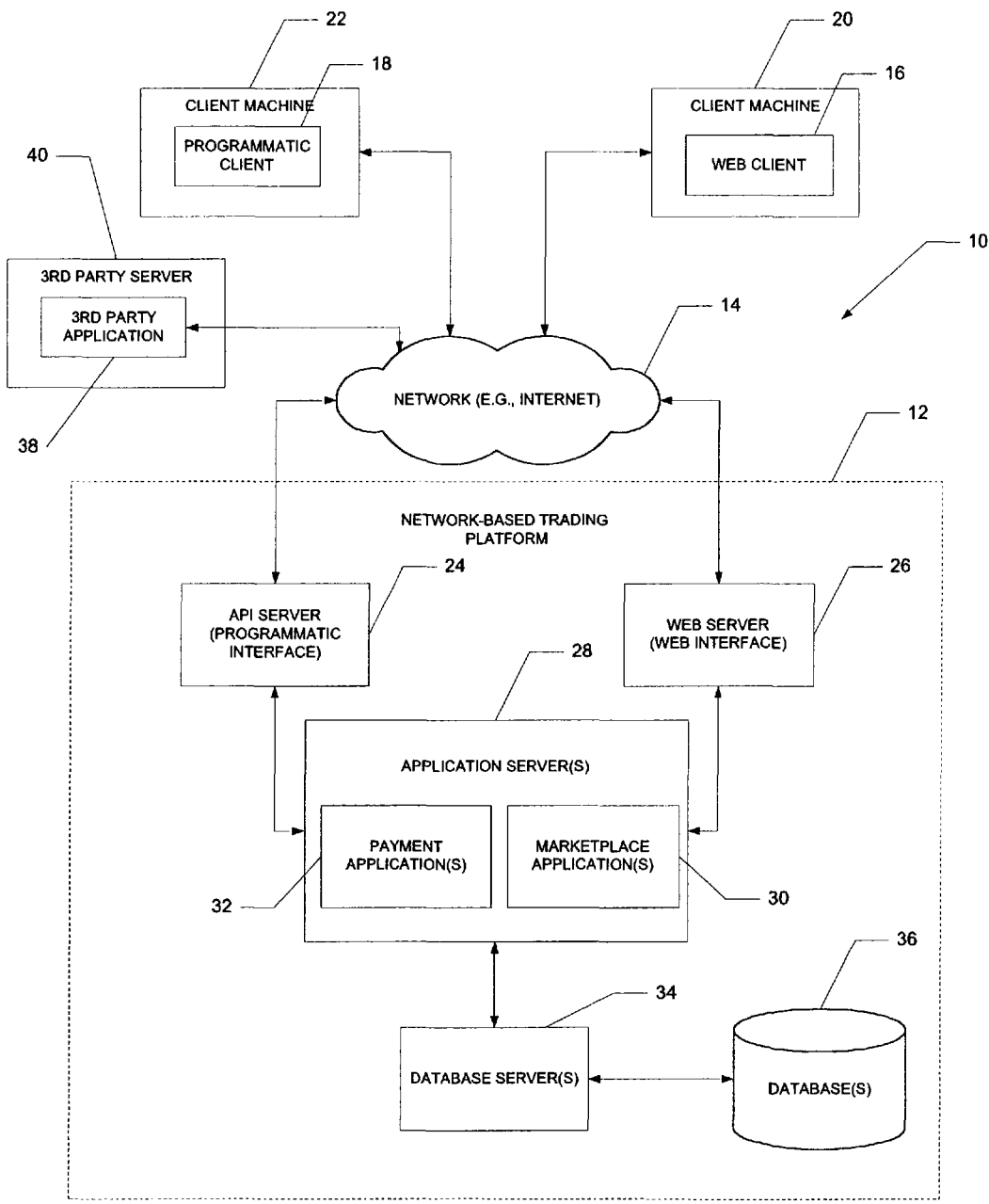
FIG. 2 is a detailed network diagram depicting a system having a client-server architecture in accordance with one exemplary embodiment of the present invention.

FIG. 2 is a network diagram depicting a system 10, according to one exemplary embodiment of the present invention, having a client-server architecture. A commerce server platform, in the exemplary form of a network-based marketplace 12, provides server-side functionality, via a network 14 (e.g., the Internet) to one or more clients. FIG. 2 illustrates, for example, a web client 16 (e.g., a browser, such as the Internet Explorer browser developed by Microsoft Corporation of Redmond, Wash. State), and a programmatic client 18 executing on respective client machines 20 and 22.

Turning specifically to the network-based marketplace 12, an Application Program Interface (API) server 24 and a web server 26 are coupled to, and provide programmatic and web interfaces respectively to, one or more application servers 28. The application servers 28 host one or more marketplace applications 30 and payment applications 32. The application servers 28 are, in turn, shown to be coupled to one or more databases servers 34 that facilitate access to one or more databases 36.

The marketplace applications 30 provide a number of marketplace functions and services to users that access the marketplace 12. The payment applications 32 likewise provide a number of payment services and functions to users. The payment applications 32 may allow users to quantify for, and accumulate, value (e.g., in a commercial currency, such as the U.S. dollar, or a proprietary currency, such as "points") in accounts, and then later to redeem the accumulated value for products (e.g., goods or services) that are made available via the marketplace applications 30. While the marketplace and payment applications 30 and 32 are shown in FIG. 2 to both form part of the network-based marketplace 12, it will be appreciated that, in alternative embodiments of the present invention, the payment applications 32 may form part of a payment service that is separate and distinct from the marketplace 12.

Further, while the system 10 shown in FIG. 2 employs a client-server architecture, the present invention is of course not limited to such an architecture, and could equally well find application in a distributed, or peer-to-peer, architecture system. The various marketplace and payment applications 30 and 32 could also be implemented as standalone software programs, which do not necessarily have networking capabilities.

The web client 16, it will be appreciated, accesses the various marketplace and payment applications 30 and 32 via the web interface supported by the web server 26. Similarly, the programmatic client 18 accesses the various services and functions provided by the marketplace and payment applications 30 and 32 via the programmatic interface provided by the API server 24. The programmatic client 18 may, for example, be a seller application (e.g., the TurboLister application developed by eBay Inc., of San Jose, Calif.) to enable sellers to author and manage listings on the marketplace 12 in an off-line manner, and to perform batch-mode communications between the programmatic client 18 and the network-based marketplace 12.

FIG. 2 also illustrates a third party application 38, executing on a third party server machine 40, as having programmatic access to the network-based marketplace 12 via the programmatic interface provided by the API server 24. For example, the third party application 38 may, utilizing information retrieved from the network-based marketplace 12, support one or more features or functions on a website hosted by the third party. The third party website may, for example, provide one or more promotional, marketplace or payment functions that are supported by the relevant applications of the network-based marketplace 12.

Marketplace Applications

Figure 3:
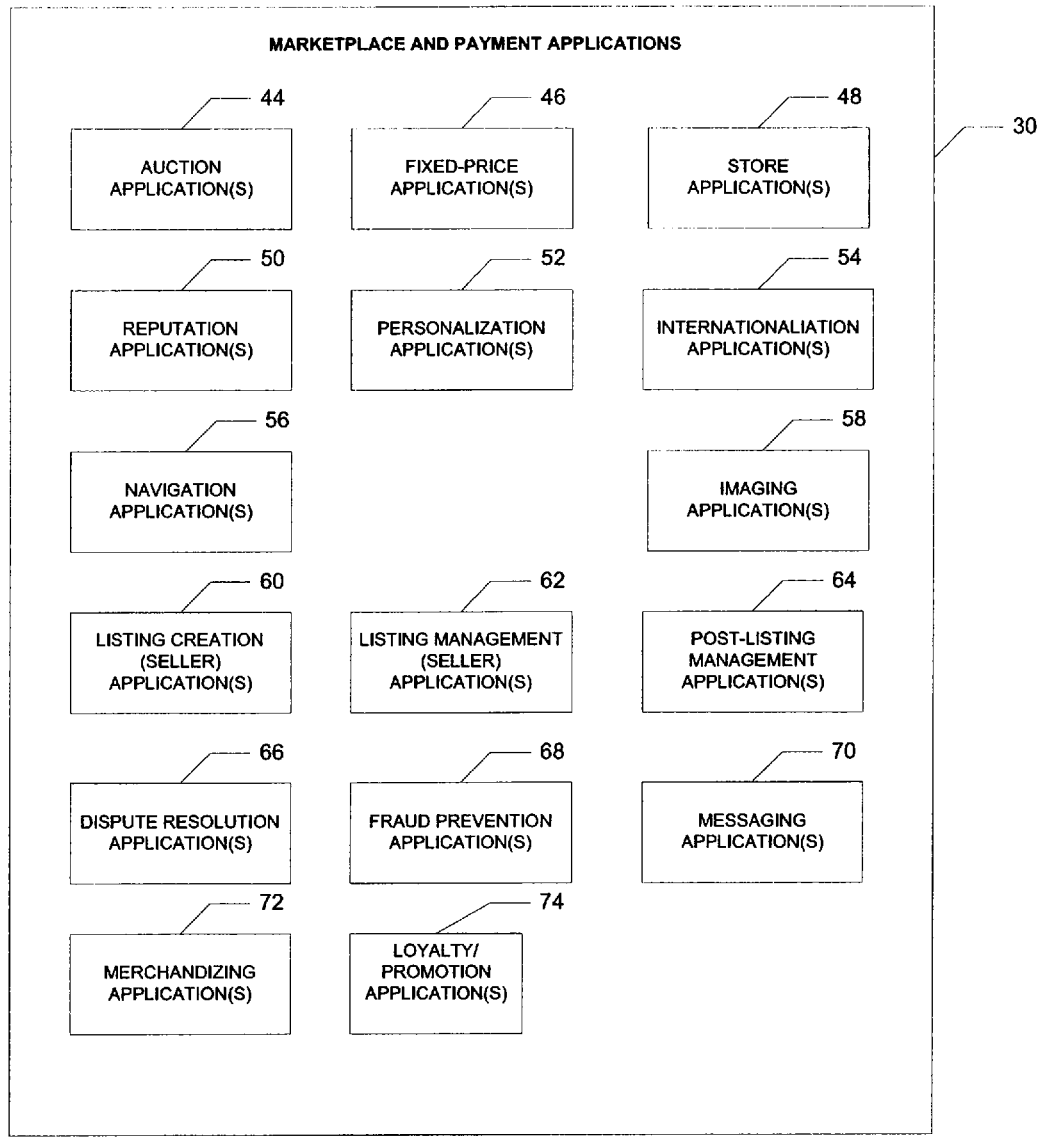
FIG. 3 is a block diagram illustrating multiple marketplace and payment applications in one exemplary embodiment of the present invention.

FIG. 3 is a block diagram illustrating multiple marketplace and payment applications 30 that, in one exemplary embodiment of the present invention, are provided as part of the network-based marketplace 12. The marketplace 12 may provide a number of listing and price-setting mechanisms whereby a seller may list goods or services for sale, a buyer can express interest in or indicate a desire to purchase such goods or services, and a price can be set for a transaction pertaining to the goods or services. To this end, the marketplace applications 30 are shown to include one or more auction applications 44 which support auction-format listing and price setting mechanisms (e.g., English, Dutch, Vickrey, Chinese, Double, Reverse auctions etc.). The various auction applications 44 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 46 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with an auction-format listing, and allow a buyer to purchase goods or services, which are also being offered for sale via an auction, for a fixed-price that is typically higher than the starting price of the auction.

Store applications 48 allow sellers to group their listings within a "virtual" store, which may be branded and otherwise personalized by and for the sellers. Such a virtual store may also offer promotions, incentives and features that are specific and personalized to a relevant seller.

Reputation applications 50 allow parties that transact utilizing the network-based marketplace 12 to establish, build and maintain reputations, which may be made available and published to potential trading partners. Consider that where, for example, the network-based marketplace 12 supports person-to-person trading, users may have no history or other reference information whereby the trustworthiness and credibility of potential trading partners may be assessed. The reputation applications 50 allow a user, for example through feedback provided by other transaction partners, to establish a reputation within the network-based marketplace 12 over time. Other potential trading partners may then reference such a reputation for the purposes of assessing credibility and trustworthiness.

Personalization applications 52 allow users of the marketplace 12 to personalize various aspects of their interactions with the marketplace 12. For example a user may, utilizing an appropriate personalization application 52, create a personalized reference page at which information regarding transactions to which the user is (or has been) a party may be viewed. Further, a personalization application 52 may enable a user to personalize listings and other aspects of their interactions with the marketplace 12 and other parties.

In one embodiment, the network-based marketplace 12 may support a number of marketplaces that are customized, for example, for specific geographic regions. A version of the marketplace 12 may be customized for the United Kingdom, whereas another version of the marketplace 12 may be customized for the United States. Each of these versions may operate as an independent marketplace, or may be customized (or internationalized) presentations of a common underlying marketplace.

Navigation of the network based-marketplace 12 may be facilitated by one or more navigation applications 56. For example, a search application enables key word searches of listings published via the marketplace 12. A browse application allows users to browse various category, catalogue, or inventory data structures according to which listings may be classified within the marketplace 12. Various other navigation applications may be provided to supplement the search and browsing applications.

In order to make listings, available via the network-based marketplace 12, as visually informing and attractive as possible, the marketplace applications 30 may include one or more imaging applications 58 utilizing which users may upload images for inclusion within listings. An imaging application 58 also operates to incorporate images within viewed listings. The imaging applications 58 may also support one or more promotional features, such as image galleries that are presented to potential buyers. For example, sellers may pay an additional fee to have an image included within a gallery of images for promoted items.

Listing creation applications 60 allow sellers conveniently to author listings pertaining to goods or services that they wish to transact via the marketplace 12, and listing management applications 62 allow sellers to manage such listings. Specifically, where a particular seller has authored and/or published a large number of listings, the management of such listings may present a challenge. The listing management applications 62 provide a number of features (e.g., auto-relisting, inventory level monitors, etc.) to assist the seller in managing such listings. One or more post-listing management applications 64 also assist sellers with a number of activities that typically occur post-listing. For example, upon completion of an auction facilitated by one or more auction applications 44, a seller may wish to leave feedback regarding a particular buyer. To this end, a post-listing management application 64 may provide an interface to one or more reputation applications 50, so as to allow the seller conveniently to provide feedback regarding multiple buyers to the reputation applications 50.

Dispute resolution applications 66 provide mechanisms whereby disputes arising between transacting parties may be resolved. For example, the dispute resolution applications 66 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 68 implement various fraud detection and prevention mechanisms to reduce the occurrence of fraud within the marketplace 12.

Messaging applications 70 are responsible for the generation and delivery of messages to users of the network-based marketplace 12, such messages for example advising users regarding the status of listings at the marketplace 12 (e.g., providing "outbid" notices to bidders during an auction process or to provide promotional and merchandising information to users).

Merchandising applications 72 support various merchandising functions that are made available to sellers to enable sellers to increase sales via the marketplace 12. The merchandising applications 80 also operate the various merchandising features that may be invoked by sellers, and may monitor and track the success of merchandising strategies employed by sellers.

The network-based marketplace 12 itself, or one or more parties that transact via the marketplace 12, may operate loyalty programs that are supported by one or more loyalty/promotions applications 74. For example, a buyer may earn loyalty or promotions points for each transaction established and/or concluded with a particular seller, and be offered a reward for which accumulated loyalty points can be redeemed.

Data Structures

Figure 4:
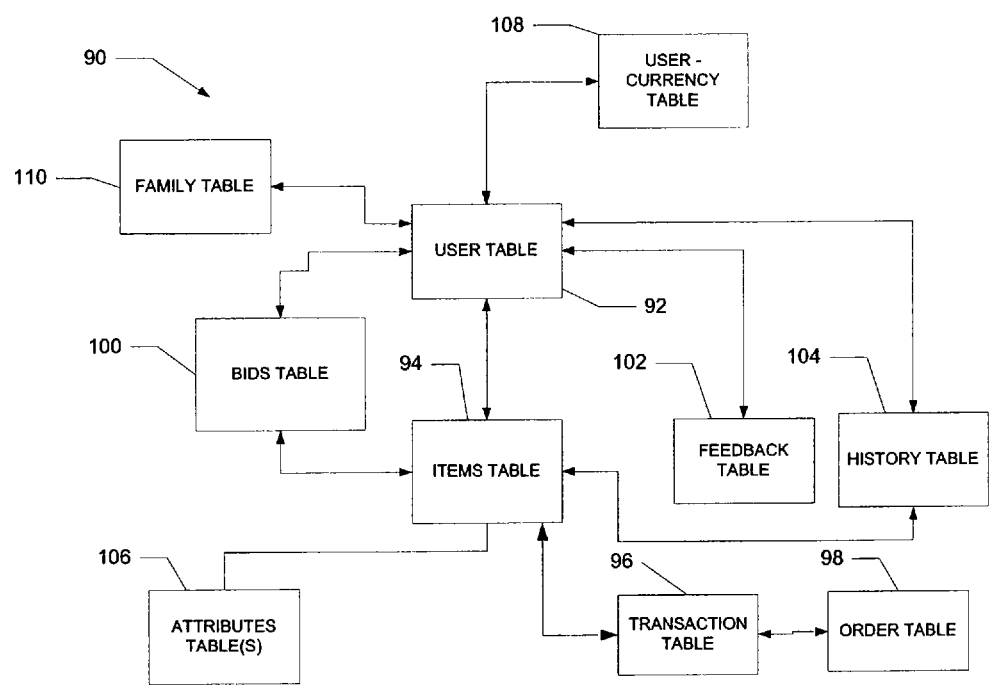
FIG. 4 is a high-level entity-relationship diagram in accordance with an example embodiment of the present invention.

FIG. 4 is a high-level entity-relationship diagram, illustrating various tables 90 that may be maintained within the databases 36, and that are utilized by and support the marketplace and payment applications 30 and 32. A user table 92 contains a record for each registered user of the network-based marketplace 12, and may include identifier, address and financial instrument information pertaining to each such registered user. A user may, it will be appreciated, operate as a seller, a buyer, or both, within the network-based marketplace 12. In one exemplary embodiment of the present invention, a buyer may be a user that has accumulated value (e.g., commercial or proprietary currency), and is then able to exchange the accumulated value for items that are offered for sale by the network-based marketplace 12.

The tables 90 also include an items table 94 in which are maintained item records for goods and services that are available to be, or have been, transacted via the marketplace 12. Each item record within the items table 94 may furthermore be linked to one or more user records within the user table 92, so as to associate a seller and one or more actual or potential buyers with each item record.

A transaction table 96 contains a record for each transaction (e.g., a purchase transaction) pertaining to items for which records exist within the items table 94.

An order table 98 is populated with order records, each order record being associated with an order. Each order, in turn, may be with respect to one or more transactions for which records exist within the transactions table 96.

Bid records within a bids table 100 each relate to a bid received at the network-based marketplace 12 in connection with an auction-format listing supported by an auction application 44. A feedback table 102 is utilized by one or more reputation applications 50, in one exemplary embodiment, to construct and maintain reputation information concerning users. A history table 104 maintains a history of transactions to which a user has been a party. One or more attributes tables 106 record attribute information pertaining to items for which records exist within the items table 94. Considering only a single example of such an attribute, the attributes tables 106 may indicate a currency attribute associated with a particular item, the currency attribute identifying the currency of a price for the relevant item as specified in by a seller.

Figure 5:
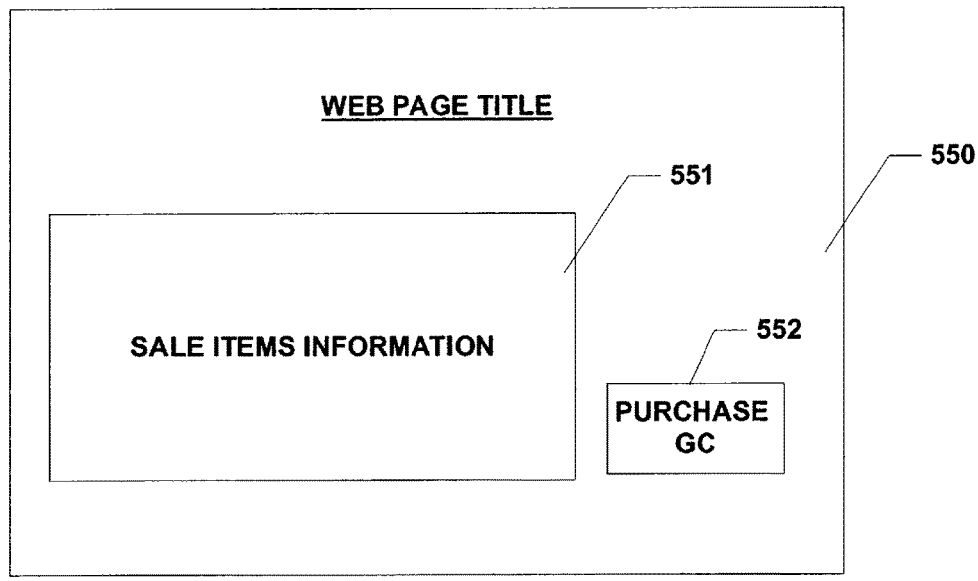
FIG. 5 is a diagram of a web page provided by a commerce server to a client providing a link to purchase an electronic gift certificate from a payment server according to an exemplary embodiment of the present invention.

FIG. 5 is a user interface diagrams illustrating a web page 550 provided by a commerce server to a client providing a link to purchase an electronic gift certificate from a payment server according to an exemplary embodiment of the present invention. In this embodiment, a web page 550 is provided to client 151 by commerce server 142 as part of one or more web pages utilized in an attempt to sell goods and/or services. On this web page 550, information relating to the sale of goods and services 551 is provided by commerce server 142. Typically, this information is the contents of a web page that may be organized into any arrangement useful in displaying information to a user of client 151. Within web page 550, a button or hyperlink 552 is provided to permit the user of client 151 to initiate purchase of a gift certificate that may be used at a later date to complete a transaction associated with commerce server 142.

When user of client 151 invokes processing associated with button 552, http code and related instructions are executed to initiate purchase of a gift certificate. This http code may include a URL to transfer client 151 to a web page provided by payment server 143. Within this http code, a data ID associated with commerce server 142 may be embedded to inform payment server 143 that a gift certificate associated with commerce server 142 is requested. Payment server 143 provides client 151 with a sequence of web pages to collected needed information to complete the sale of a gift certificate associated with commerce server 142. In an exemplary embodiment, the gift certificate may be associated with a single commerce server, which is a single web site, a single merchant, or a single entity. As such, the commerce server ensures that a subsequent sale of goods or services is made when the gift certificate is redeemed. Such an arrangement promotes future sales of items provided by commerce server 142.

In an alternate embodiment, a gift certificate may be provided by a collection of merchants that each maintain a separate commerce server. In this embodiment, the purchase gift certificate button 552 initiates a sale of a gift certificate redeemable for a transaction associated with any commerce server within the collection of merchants. This arrangement permits a "mall" in which its stores maintain commerce web sites to sell goods to sell a gift certificate for use in purchase of goods from any store within the mall. This mall may correspond to a physical mall in which stores offering goods to customers also maintain web sites to sell products. This mall may also correspond to a "virtual mall" containing a collection of web sites that may provide common marketing information as if the on-line merchants were present within the virtual mall. As such, a gift certificate purchased and redeemed in accordance with the present invention may be redeemed by a predefined collection of commerce servers as desired without deviating from the spirit and scope of the present invention as recited within the attached claims.

Figure 6:
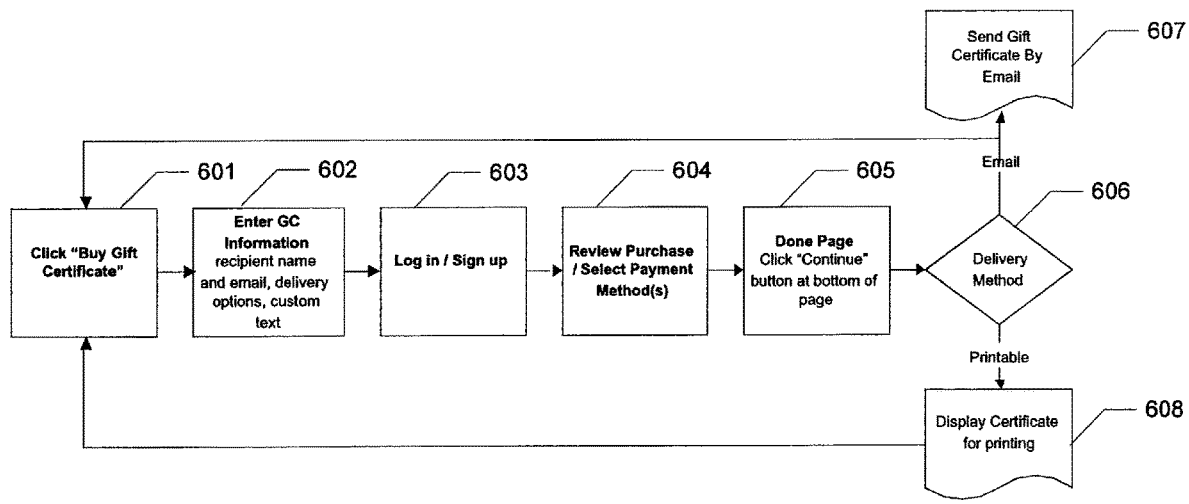
FIG. 6 is a flow diagram of a sequence of web pages provided to a client providing for purchase an electronic gift certificate from a payment server according to an exemplary embodiment of the present invention.

FIG. 6 is a flow diagram of a sequence of web pages provided to a client providing for purchase an electronic gift certificate from a payment server 143, according to an exemplary embodiment of the present invention. As discussed above, a gift certificate is purchased by a user of a client computer in a manner similar to purchase of any goods and services sold over the Internet. This gift certificate provides an identity of a recipient for the gift certificate using an e-mail address. This e-mail address is used when the gift certificate is redeemed to ensure the recipient of the gift certificate is in fact redeeming the gift certificate.

When a gift certificate is purchased, a user of a client computer is typically viewing a commerce server web page or email. The user starts the purchase process using a purchase gift certificate button or link 552 on the web page or email (601). The user of the client computer then views a gift certificate information collection page provided by payment server 142. This web page may look similar to the commerce server web page and may include the commerce server title in the domain used to access the web page. This page may allow the user of the client computer to enter the recipient's email, name, and custom text that is associated with the gift certificate (602). The user of the client computer may also be able to specify a delivery date for when the recipient receives his or her gift certificate notification. The user of the client computer may have an option to print the gift certificate. (When off-the commerce platform gift certificates (GCs) are available, printable may be a merchant-specific option).

The user of the client computer may then proceed through the payment service payment flow that solicits a login or sign up to payment server 143 (603). The user logs into payment server 143 in a usual manner to access a unique user account. The user uses an e-mail address to identify the payment service account to be used for this transaction. When a user does not already possess an account on payment server 142, a process to create an account is used. The use of an e-mail address as the account ID permits payment server 143 to authenticate and confirm the identity of a user by sending an e-mail message to the corresponding e-mail account containing unique information and/or a hyperlink that is then provided by a user to payment server 143 after receipt of the e-mail message. This confirmation process may be part of anti-fraud features used to ensure that funds are transferred to and from users of a known identity.

Once the user logs into payment server 143, a review web page is provided to the purchaser's client computer to summarize the purchase and obtain payment information (604). Typically a user may select from any number of supported payment options including use of funds from a credit card, funds withdrawn from a bank account associated with the account, and any funds previously transferred into the account. As noted above, payment accounts may be associated with sellers of goods using an on-line auction web site. Payments received from sale of goods associated with an on-line auction may be present in a payment account. Any funds in the account may be used in purchasing a gift certificate.

Once adequate payment information is received, user of the client computer is directed to a done web page (605) that indicates the completion of the transaction. The web page may contain a button or link to return the user to the commerce server web site from which the purchase of gift certificate was initiated. As such, the user may believe that the purchase of the gift certificate was completed as part of the operation of the commerce server web site, whether or not the commerce server and the payment server are operated as a single entity. When the purchaser clicks to continue from the done page, the user may return to the commerce platform.

The completion of the purchase of gift certificate 145 concludes with payment server determining the delivery method specified by the purchaser when gift certificate 145 was specified (606). In most cases, an electronic gift certificate is included within an e-mail message that is sent to a recipient at the e-mail address specified when gift certificate 145 is purchased (607). Information contained within this e-mail message is used to authenticate the recipient of the e-mail address to be the intended recipient of gift certificate 145.

In an alternate embodiment, gift certificate 145 is specified as a web page provided to the client computer of the user purchasing the gift certificate (608). The purchaser print the gift certificate by printing the web page using a web browser to any attached printer accessible by the client computer. The web page contains a unique redemption code that is used to identify the gift certificate to payment server 143 when gift certificate 145 is redeemed. A user of a client computer redeeming gift certificate 145 enters this redemption code into an information web page as part of the gift certificate redemption process. When this redemption code is entered, gift certificate 145 then becomes associated with an e-mail address of the user redeeming the gift certificate as if the e-mail address had been specified when purchased. Associating a gift certificate with an e-mail address before redemption is completed permits payment server 143 to receive confirmation information associated with the e-mail address when an account is created for the e-mail address. Thus, payment server 143 possesses a mechanism to investigate fraudulent redemption of gift certificates as information relating to the e-mail address, the IP address of its e-mail server, and related identity information of the e-mail address owner may be obtained when needed.

In one embodiment, the payment server 143 may require web pages to be rendered differently depending upon the country of the user. This rendering for each country may be in part be implemented universally. For example, the following web page data characteristics may be implemented universally: language of a feature (on the website templates), a language rendered on a web page may be defined on a per country basis, thus only needing to identify for which countries the feature will be available; Unicode data conversion; country codes (e.g., United Kingdom=UK and Germany=DE); Language Codes; Time Zone Format; Calendar Format; Phone Number Format; Name/Address Format; Currency Format; and Fields: Character Lengths. Other similar web page characteristics may also be implemented in this manner.

Other international/localization issues include the currency used within the payment server 143. In one exemplary embodiment, gift certificates are available in USD. International buyers, recipients, and merchants are not restricted from the use of gift certificates. Gift certificate-related pages may be translated in a country-specific manner.

Figure 7:
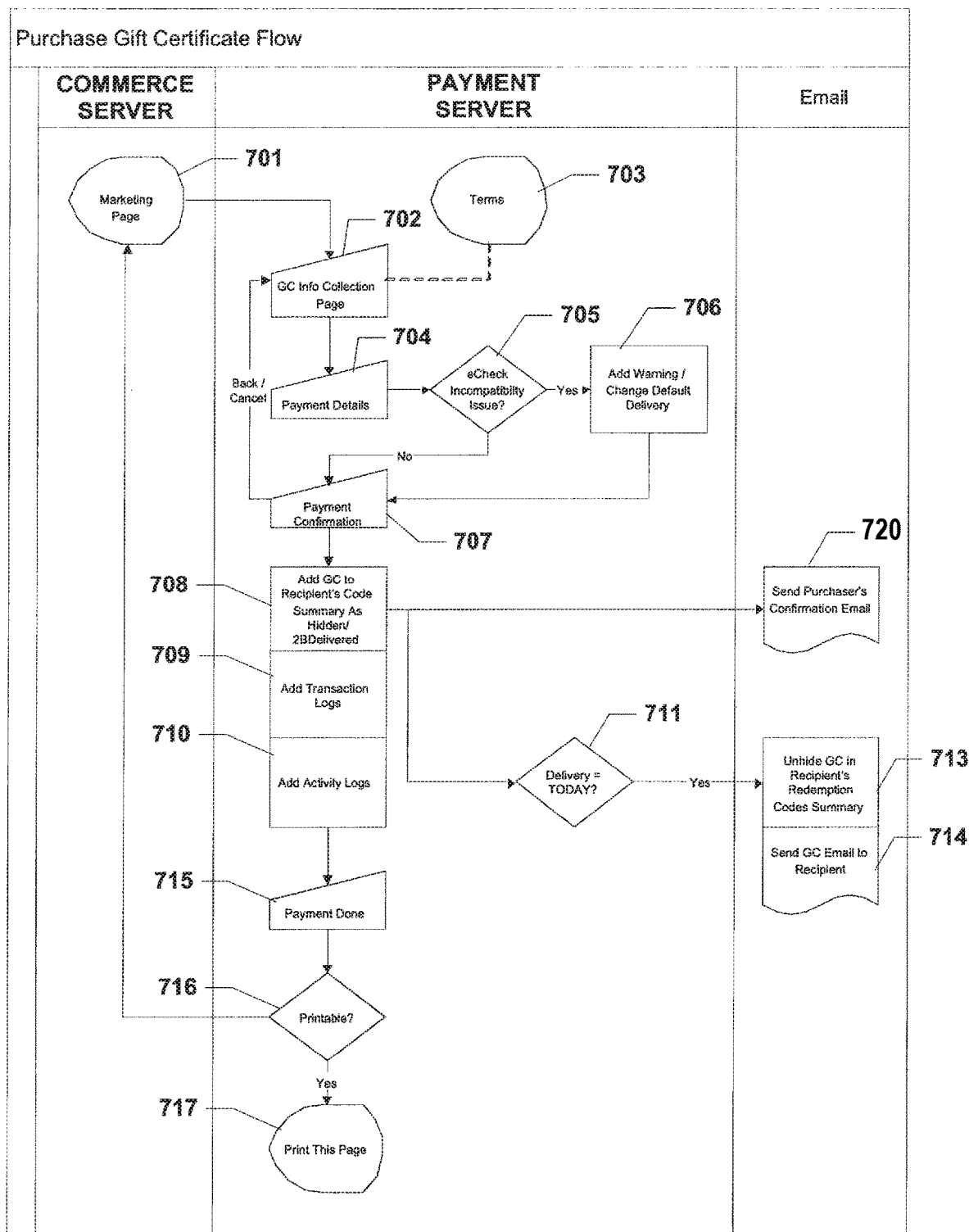
FIG. 7 is a more detailed flow diagram of a sequence of web pages provided to a client providing for purchase an electronic gift certificate from a payment server according to an exemplary embodiment of the present invention.

FIG. 7 is a more detailed flow diagram of a sequence of web pages provided to a client providing for purchase an electronic gift certificate from a payment server, according to an exemplary embodiment of the present invention. The purchase of a gift certificate begins on a marketing page on the commerce server (701). On this page, a purchase gift certificate button or link 552 is presented thatd, when activated, transfers a user to a gift certificate information collection page (702). In one embodiment, the URL for the gift certificate information collection page uses a URL related to the commerce server 142 even if the page is processed by the payment server 143. The servers may perform the necessary IP address resolution and translation to permit the user to believe the web sites are one in the same. The gift certificate information collection page generated may possess a look and feel of the commerce server site 142 to maintain the appearance of an integrated site. The gift certificate information collection page includes a plurality of data fields that a user enters data to specify the gift certificate to be purchased. These data fields may include a recipient name field, recipient e-mail address field, sender name field, amount field, an optional personal message field, a delivery method selection field. The recipient and sender e-mail fields specify e-mail addresses for e-mail accounts reachable over the Internet for the respective parties.

The amount field specifies the numerical value for the gift certificate being purchased. In various embodiments, the amount value specified in this amount field may correspond to a set of predetermined values, a range of values having minimum and maximum amounts, and any user specified amounts as desired by the operators of the payment server.

The delivery method selection field provides the sender a mechanism to select when and how the purchased gift certificate is to be provided to the recipient. The sender may specify either that the gift certificate be sent by e-mail message or be sent by printing a web page containing a graphical representation of the gift certificate. If the sender specifies the gift certificate is sent via an e-mail message, the sender may specify the date and time when the e-mail message is to be sent. This date may specify, immediately, later today, tomorrow, a day within the coming week referenced by the day of the week, or a date specified by a calendar date.

The gift certificate information collection page may also contain additional items including an error reporting field to specify errors and/or missing data items when a gift certificate is attempted to be purchased. The page may also contain an e-mail warning message that remind the sender of the need to accurately enter e-mail addresses into respective fields as they are used in purchasing and redeeming gift certificates. A terms link may be provided to provide the sender with a detailed written description of all applicable legal terms associated with the purchase and redemption of the gift certificate when the link is activated. Other informational links provided on this web page may include a redemption instruction link, a purchase FAQ link, a redemption FAQ link, a gift certificate sample link, an about payment service link, and an need help link. Each of these links provides the sender with additional information useful in purchasing and redeeming gift certificates (703).

The gift certificate information collection page possesses a purchase button or link to purchase the gift certificate using a payment service provided by the payment server. As part of the operation of this link, the payment server performs error checking to ensure that all needed information is provided and is accurate. When incomplete and inaccurate information is found during error checking, appropriate error messages are provided to the sender in the error reporting field and the certificate information collection page remains for the sender to provide updated information.

Once all of the correct information is provided and passes error correction processing, the payment server transfers processing to a payment details web page (704). This web page provides a sender with a mechanism to identify a source of funds to be used to purchase the gift certificate. In one exemplary embodiment, a payment service provided by payment server 143 is used to provide a funding mechanism for gift certificate purchases. This service provides a sender sources including credit cards, eChecks, electronic transfers from bank accounts previously associated with a payment service account, and existing balances present within a payment service account. The sender logs into his or her payment service account using an e-mail address provided when purchasing the gift certificate. If an account associated with this e-mail address exists, the sender may log in using a usual authentication mechanism such as providing a password. If an account does not exist, the payment server may initiate creation of an account. This account creation process may include use of e-mail messages sent to the corresponding e-mail accounts in which the message contains unique information that must be returned to the payment server to create the account. This information may include a unique identification code or a hyperlink that returns a unique identification code to the server. As such, the payment server may confirm that the sender e-mail address is owned, and accessible, by the sender creating the payment service account.

The sender enters into the payment details page and processing continues with an eCheck compatibility check in which eCheck payment information is verified (705). If an incompatibility is found within the eCheck payment option, an warning message is generated and added to payment confirmation page (706). If an eCheck is not used, or if no compatibility is found, processing continues directly to a payment confirmation page (707).

The payment confirmation page provides the sender with all relevant information associated with the pending purchase of the gift certificate. The page may include an edit information button or link to return the sender to the certificate information collection page to change data values. In such a case, the data fields are pre-populated with existing information to prevent the sender from needing to re-enter data. The page possesses a cancel purchase button or link to terminate the purchase process for the gift certificate before a transaction has been completed. The page also possesses a continue purchase button or link to initiate the completion of the transaction using the information provided the payment confirmation page.

Once the sender completes the purchase transaction using the continue purchase button, a sequence of operations occurs within the payment server. First, the purchased gift certificate is stored within the payment server as an entry in the payment services account associated with the recipient's e-mail address (708). If the gift certificate is to be delivered at a date in the future, entry is marked as being a hidden entry in the recipient's account until the gift certificate has been delivered as specified when purchased. An entry for the purchase of the gift certificate is made within a transaction log for the sender and the recipient (709) to provide the relevant parties with history information for viewing at a later date. Similarly entries are made in activity logs within the payment server to permit audits as needed (710). Once all of these entries have been made, the payment is done (715) and a final confirmation page is provided to the sender.

Once the sender completes the purchase of the gift certificate, the processing determines if the gift certificate is available in a printable form (716). If it is, the sender may print the gift certificate (717). If the gift certificate is not printable, the sender may be returned to the commerce server marketing page as the gift certificate process has been completed.

While the above operations occur, the payment server sends an e-mail to the sender's e-mail address with all relevant information relating to the transaction to provide an electronic receipt for the transaction (720). In addition if a gift certificate has been fraudulently purchased using an e-mail account of an un-expecting party, this e-mail message provides a mechanism for catching fraudulent transaction as soon as possible. This e-mail message will contain the sender's identity information, the recipient's identity information, gift certificate amounts, redemption code information, and all related payment information for use by the sender.

Finally, the payment server 143 checks to see if the gift certificate is to be delivered today (712). If the gift certificate is to be sent today, the payment server 143 unmarks the gift certificate in the recipient's account as now being hidden (713). As such, the recipient may see and use the gift certificate when desired. The payment server also sends an e-mail message to the recipient's e-mail address informing the recipient of the arrival of the gift certificate in the recipient's payment service account. This e-mail message may contain information identifying the sender of the gift certificate, the merchant or commerce server web site where the gift certificate may be redeemed, and information associated with the use of the payment service to redeem the gift certificate. Much of this information may be provided within the email message itself, within web pages accessed using hyperlinks included within the e-mail message, and a combination of these two arrangements.

The embodiments described above disclose a client-server processing system in which communications between the client and server occur as a sequence of web pages provided by a web server that are rendered on the client computer as HTML documents processed within a web browser. One skilled in the art will recognize that a client-server distributed processing application that obtains the above described data needed to purchase a gift certificate may be obtained using a custom application running on the client computer where the data is communicated with the remote payment server and the remote commerce server using APIs that enable the transfer of the data between the computing systems. As such, the above embodiments are for illustrative purposes and other client-server application architectures may be used without departing from the spirit and scope of the present invention as recited within the attached claims.

Figure 8:
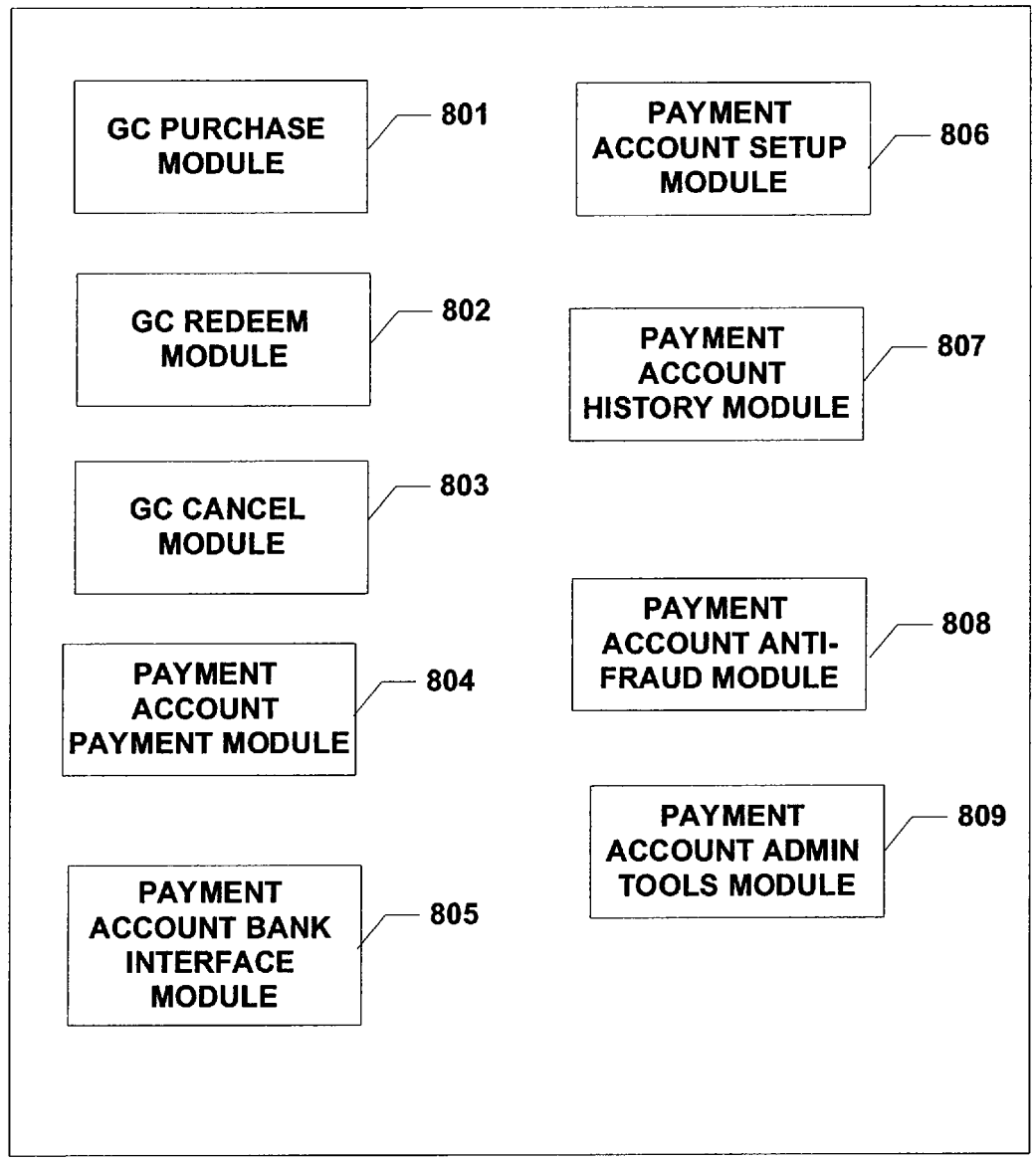
FIG. 8 is a block diagram illustrating a set of processing modules within a payment server for use in purchasing and redemption of electronic gift certificates according to an exemplary embodiment of the present invention.

FIG. 8 is a block diagram illustrating a set of processing modules within a payment server 143 for use in purchasing and redemption of electronic gift certificates, according to an exemplary embodiment of the present invention. Payment server 143 includes a set of processing modules to implement its processing functions. These processing modules include a gift certificate purchase module 801, a gift certificate redemption module 802, a gift certificate cancellation module 803, a payment account payment module 804, a payment account bank interface module 805, a payment account set-up module 806, a payment account history module 807, a payment account anti-fraud module 808, and a payment account admin tools module 809.

The gift certificate purchase module 801 performs all of the processing associated with purchase of a gift certificate by a sender and subsequent transfer of the gift certificate to its recipient. The gift certificate redemption module 802 performs all of the processing associated with redemption of a gift certificate to complete a transaction between the gift certificate recipient and a merchant/commerce web site. The gift certificate cancellation module 803 performs all of the processing associated with canceling an issued gift certificate typically when an error in the amount of the gift certificate or an error in the identity of the recipient as specified in the recipient e-mail address prior to the redemption of the gift certificate.

The payment account payment module 804 performs all of the processing associated with an account holder making a payment to another entity using the payment service of the payment server. The payment account bank interface module 805 performs all of the processing associated with an account holder transferring monies to and from a bank account of the payment account owner using the payment service of the payment server. The payment account set-up module 806 performs all of the processing associated with an account holder setting up an account with the payment service of the payment server that is associated with an e-mail address of the account holder. The payment account history module 807 performs all of the processing associated with providing an account holder a history of all prior payments, fund transfers and gift certificate purchase and redemption using the payment service of the payment server. The payment account anti-fraud module 808 performs all of the processing associated with an authenticating an account holder when the account holder interacts with the payment service of the payment server to prevent fraudulent payments from being made. Finally, payment account admin tools module 809 performs all of the processing associated with an providing account holder administrative tools to manage an account with the payment service of the payment server.

Figure 9:
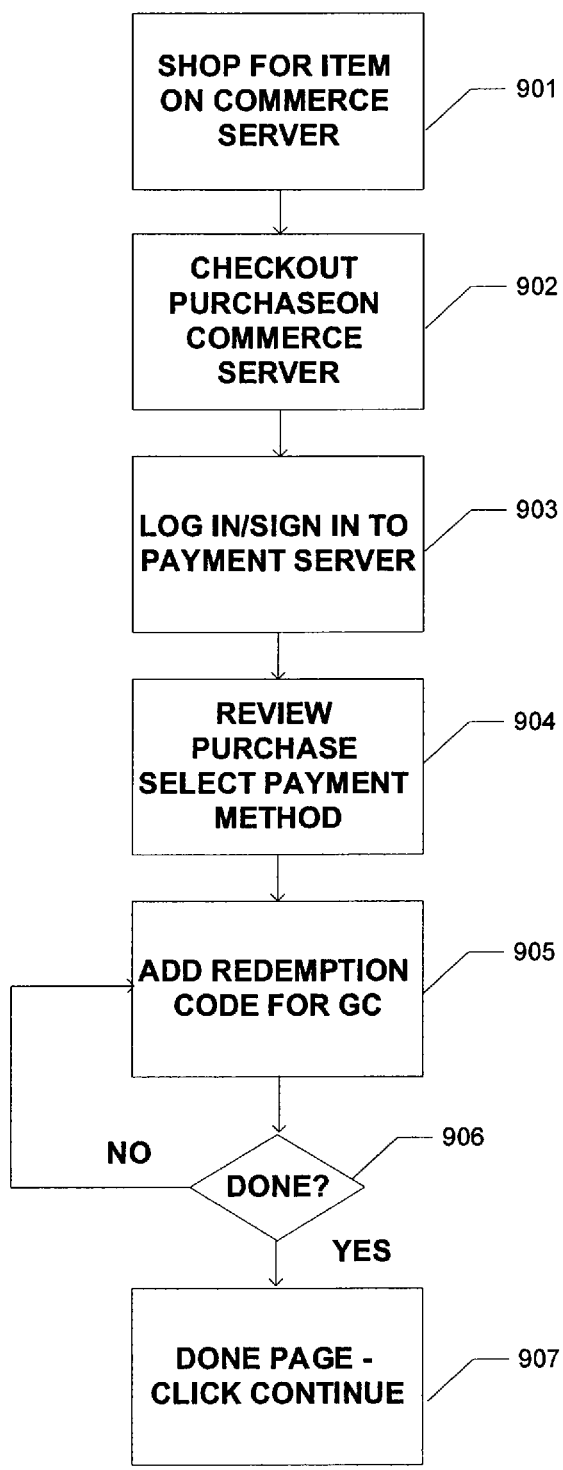
FIG. 9 is a flow diagram of a sequence of web pages provided to a client providing for redemption of an electronic gift certificate from a payment server according to an exemplary embodiment of the present invention.

FIG. 9 is a flow diagram of a sequence of web pages provided to a client providing for redemption of an electronic gift certificate from a payment server 143, according to an exemplary embodiment of the present invention. When a customer of an on-line merchant wishes to redeem a gift certificate previously provided to him or her, the customer shops for items to be purchased from an on-line merchant by using a client computer to interact with a commerce server to initiate a sale (901). The customer selects items for purchase that are subsequently placed into a shopping cart. These items may be selected from an on-line catalog of available items, or may be selected by successful completion of an on-line auction in which the customer is the winning bidder.

Once a customer has placed all items to be purchased into a shopping cart, the customer performs a check-out procedure in which the customer may use an on-line payment service to provide payment to the on-line merchant while keeping information such as identification for the customer, a shipping address, a billing address, and a payment/credit card information in a single location (902). This check-out procedure requires a customer to log into a payment server 143 operated by the payment service (903). A unique e-mail address owned by the customer is used as a unique identifier for the user account within the payment service. Use of the e-mail address that is uniquely controlled by the user/customer permits the payment service to confirm the identity of the customer and the corresponding e-mail address before any payment transactions occur. As such, payment services may obtain a desired degree of confidence that it has obtained a known identity of a customer using the payment service. In addition, e-mail accounts are provided to users by third parties such as Internet service provides (ISPs) and on-line services such as Yahoo and Google. This e-mail account provides obtain user identity information that may permit subsequent tracing of fraudulent users to IP addresses when needed.

Once a customer has successfully logged into the payment service, the purchase may be reviewed and a payment method may be selected (904). In the case of the use of a gift certificate, the customer's account has previously received the gift certificate from its sender when the gift certificate was purchased. If a particular customer does not possess an account with the payment service before a gift certificate is redeemed, the payment service may require creation of an account, with its corresponding confirmation of the ownership of the e-mail address associated with the gift certificate being redeemed in order to authenticate the identity of the customer as the intended recipient of the gift certificate.

The successful selection of a gift certificate is completed with the selection of a redemption code associated with the gift certificate for use in completing the transaction for the sale of goods and services (905). In one embodiment, this redemption code is found within the gift certificate sent to an e-mail address as part of an e-mail message. The redemption code may also be embedded within a hyperlink included within an e-mail message that, when activated, provides the redemption code to the payment server for use when purchasing goods and services. Finally, the redemption code may be stored within the payment service account for the user that is selected when a payment method is selected from a list of available payment sources available to the account. In this latter case, the e-mail address of the customer is used to authenticate the customer before the redemption codes are provided for selection at time of check-out.

When a recipient redeems a gift certificate, the payment system may limit the recipient to utilize only one gift certificate per transaction. This limitation would require a recipient to use alternate payment sources, including credit cards, which are associated with the recipient's payment services account to pay for any balance needed to complete a transaction once the value of the gift certificate has been exhausted. This limitation upon the use of multiple gift certificates to pay for a single transaction ensures that a merchant will obtain a separate sales transaction for each gift certificate sold. In alternate embodiments, this limitation on the use of multiple gift certificates may not be imposed as it may cause ill will with potential customers who view any gift certificate as the equivalent of cash that may be spent at a merchant.

Once a payment selection has completed (906), the transaction may be finalized and the payment made. When payment has been made, a customer is provided a done page that may contain information summarizing the transaction and its payment information as a receipt for the transaction (907) before the entire process concludes.

Gift certificates in the disclosed embodiments are typically non-transferable once they are associated with an e-mail address. This limitation on the transferability of gift certificates, which may place a limitation upon the recipient in that he or she may not transfer the gift certificate to other individuals through changing the e-mail address associated with the gift certificate to an alternate e-mail address, does enhance the anti-fraud protection of the gift certificate. The gift certificates utilize the e-mail address (or some other form of unique communication identifier) associated with the gift certificate as the basis for authenticating whether the intended recipient is the person who ultimately redeems the gift certificate. Permitting this e-mail address to be changed by transferring the gift certificate from one e-mail address to another frustrates this intention.

Figure 10:
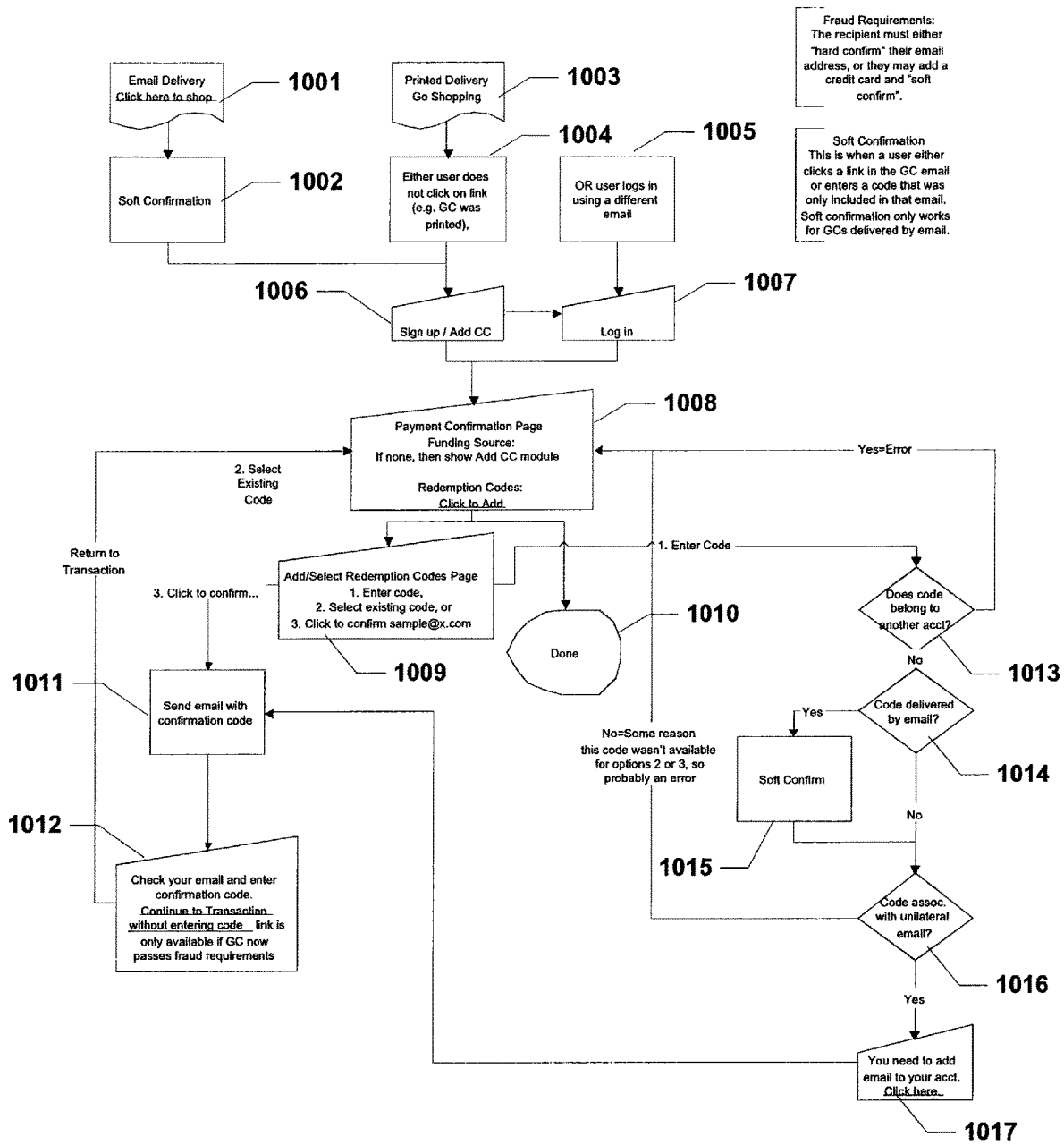
FIG. 10 is a more detailed flow diagram of a sequence of web pages provided to a client providing for redemption of an electronic gift certificate from a payment server according to an exemplary embodiment of the present invention.

FIG. 10 is a more detailed flow diagram of a sequence of web pages provided to a client providing for redemption of an electronic gift certificate from a payment server 143, according to an exemplary embodiment of the present invention. When a gift certificate is redeemed, the recipient ultimately is required to log into the payment service using the e-mail address associated with the gift certificate. This process may occur one of three ways. First, a recipient may initiate the redemption process by activating a hyperlink contained within the e-mail message sent to the recipient when the gift certificate was purchased (1101). This activation of the hyperlink also performs a soft confirmation of the identity of the recipient (1102) in that the payment server may rely upon information returned to the server when the hyperlink is activated indicating that the recipient is utilizing an e-mail message sent by the payment server. The recipient is required to create a payment service account if one does not exist that is associated with the recipient's e-mail address (1006). If a payment service account exists, the recipient may immediately log into the payment service (1107). The payment server 143 may require the creation of the account to permit resolution of disputed at a later date if redemption of the gift certificate is challenged. In some embodiments, a recipient may avoid this set up providing a valid credit card number so that the payment service may obtain a refund for erroneously processes gift certificates by charging the refund to the provided credit card account. Once all of these steps are completed, the recipient is logged into the payment service (1007).

If a recipient has received a printed gift certificate rather than an electronic gift certificate contained within an e-mail message, the recipient begins the redemption process by shopping at the merchant's web site (1003) and indicating at check out that a gift certificate is to be used. Because an e-mail account has not been associated with a printed gift certificate yet, the recipient must log into the payment service using some e-mail address (1004). If the recipient does not possess a payment service account, the recipient may be required to either create an account or provide a credit card account as described above (1006) before logging into the payment service (1007). Finally, if the recipient already possesses a payment service account (1005), the recipient may directly log into the server (1007).

Once the recipient has logged into the payment service using any of the above methods, the recipient is presented with a payment confirmation page (1008). This web page provides the recipient with all available payment sources that may be used to complete a transaction. Of the available payment sources, use of available gift certificates may be chosen. The recipient selects the use of a gift certificate through the use of a gift certificate button or hyperlink on the payment confirmation page that presents the recipient with three different means to select an available gift certificate redemption code to utilize a gift certificate for the completion of a transaction (1009). These three options include the entering of the redemption code, selecting an existing code associated with the payment account, and clicking upon a hyperlink within an e-mail message sent to a provided e-mail address.

When a recipient selects the option to enter a redemption code directly into the payment service, a series of error checks is performed to ensure the correct gift certificate is used and that the recipient is permitted to use it. First, the redemption code entered by the recipient is checked to verify that the corresponding gift certificate is associated with the e-mail address used by the recipient to log into the payment service (1013). If the redemption code does not belong to this e-mail account, an error is reported and the recipient is returned to the payment confirmation page to select a different payment option and/or attempt to re-enter a valid redemption code. If the redemption code does belong to the recipient, the payment server determines whether the redemption code corresponds to a gift certificate that was previously sent to the recipient as an e-mail message (1014). If the gift certificate was sent to the recipient as part of an e-mail message, the recipient is required to perform a soft confirmation (1015) by activating a link within the e-mail message to confirm the recipient's identity.

In either case, the payment server determines if the redemption code being selected has been confirmed with the return of confirmation data contained within at least one e-mail message (1016). If the payment server determines that the e-mail account associated with the gift certificate has been confirmed, the gift certificate associated with the entered redemption code is selected and the process returns to the payment confirmation page (1008) to complete the transaction. If the payment server determines that the e-mail account associated with the gift certificate has not been confirmed, the recipient is requested to add an e-mail account to the payment service account (1017) and the e-mail account needs to be confirmed. The e-mail account is confirmed by sending an e-mail message containing a confirmation code to the provided e-mail address (1011). The recipient retrieves the confirmation code from the e-mail message and provides it to the payment service to confirm his or her identity in order to complete the selection of the gift certificate. Once the gift certificate associated with the entered redemption code is selected, the process returns to the payment confirmation page (1008) to complete the transaction.

When the recipient selects an existing redemption code, the associated gift certificate is selected for use in this transaction. The recipient is returned to the payment confirmation page (1008) to complete the transaction. No further action is required as the payment server possesses sufficient confidence that recipient may use this redemption code following a successful log in to the payment server.

If recipient selects the option of clicking upon a hyperlink within an e-mail message sent to a provided e-mail address, an e-mail message is transmitted to an e-mail address provided by the recipient (1011) and the recipient is instructed to look for a message to be sent to this e-mail account. Upon receipt of the message, the recipient receives a confirmation code within the e-mail message that is to be entered into the payment service (1012) to confirm the identity of the recipient. If this confirmation code is successfully entered, the gift certificate is selected and the recipient returns to the payment confirmation page (1008) to complete the transaction.

Once the desired gift certificates are selected, the transaction may be finalized with the payment of the funds to the merchant and confirmation e-mail messages transmitted to the recipient before the entire process ends (1010).

The embodiments described above disclose a client-server processing system in which communications between the client and server occur as a sequence of web pages provided by a web server that are rendered on the client computer as HTML documents processed within a web browser. One skilled in the art will recognize that a client-server distributed processing application that obtains the above described data needed to redeem a gift certificate may be obtained using a custom application running on the client computer where the data is communicated with the remote payment server and the remote commerce server using APIs that enable the transfer of the data between the computing systems. As such, the above embodiments are for illustrative purposes and other client-server application architectures may be used without departing from the spirit and scope of the present invention as recited within the attached claims.

Figure 11:
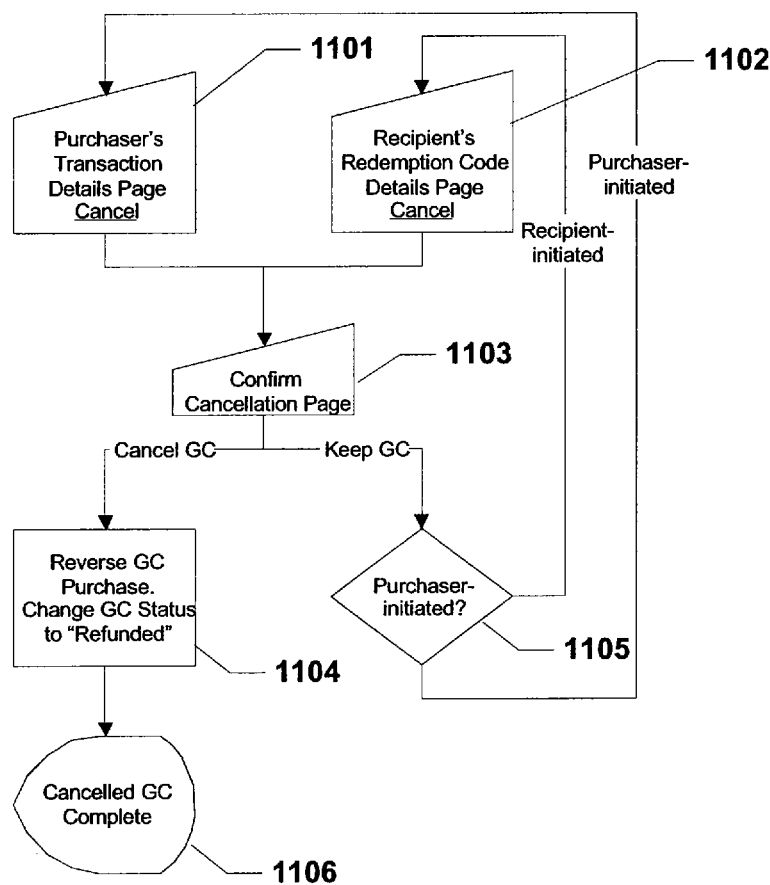
FIG. 11 is a flow diagram of a sequence of web pages provided to a client providing for cancellation of an electronic gift certificate from a payment server according to an exemplary embodiment of the present invention.

FIG. 11 is a flow diagram of a sequence of web pages provided to a client providing for cancellation of an electronic gift certificate from a payment server 143, according to an exemplary embodiment of the present invention. Gift certificates purchased for redemption as described herein may on occasion be purchased in error or may reference incorrect e-mail addresses that are used to identify the recipient of the gift certificates permitted to redeem them. Such errors may be corrected with the cancellation of the erroneous gift certificates. Anew gift certificate may be purchased to correct the error. The cancellation of a gift certificate may be initiated by either the sender/purchaser of the gift certificate or the recipient of the gift certificate. In either case, the person requesting a gift certificate must log into the payment server as described above when a gift certificate is either purchased or a gift certificate is redeemed. The party needs to log into the payment server in order to determine that the person is authorized to request the gift certificate cancellation. Only the sender and the recipient may request a gift certificate be cancelled.

A sender cancels a previously purchased but unredeemed gift certificate by navigating within the payment system of the payment server to a purchaser's transaction detail web page (1101). This web page provides a summary of the details associated with the gift certificate including the sender's identity as specified by an e-mail address, the recipient's identity as specified by the recipient's e-mail address, the date and amount of the purchased gift certificate, the status of the gift certificate indicating whether it has been redeemed, and payment information relating to the details of the transaction. A cancel gift certificate button or hyperlink is present on the web page that when activated initiates the cancellation of the gift certificate.

When the sender activates the gift certificate button or hyperlink, a confirm cancellation web page is presented to the sender (1103). This web page indicates whether a full refund or a partial refund is possible depending upon the amount of the unused balance. The web page also provides information identifying to whom any refund of existing funds are provided. The web page includes a cancel gift certificate button or hyperlink and a retain gift certificate or hyperlink. When a sender/purchaser activates the cancel gift certificate button, processing within the payment server causes the gift certificate to be marked as being refunded within the transaction logs associated with both the sender and the recipient (1104). The monies held in the unredeemed gift certificate balance within the merchant's payment service account that is associated with this particular gift certificate is transferred to the payment service account of the sender to perform the refund. Finally, an e-mail message is sent by the payment server to both the sender and the recipient of the gift certificate to inform the relevant parties of the refund transaction's occurrence has been completed (1106).

If the sender activates the retain gift certificate button, the payment server determines whether the sender or recipient of the gift certificate is performing the cancellation operation (1105) before returning the sender to the sender's transaction detail web page (1101) where the sender may repeat the above process as desired.

A recipient cancels a previously purchased but unredeemed gift certificate by navigating within the payment system of the payment server to a recipient's transaction detail web page (1102). This web page also provides a summary of the details associated with the gift certificate including the sender's identity as specified by an e-mail address, the recipient's identity as specified by the recipient's e-mail address, the date and amount of the purchased gift certificate, and the status of the gift certificate indicating whether it has been redeemed. A cancel gift certificate button or hyperlink is present on the web page that when activated initiates the cancellation of the gift certificate. When the recipient activates the gift certificate button or hyperlink, the confirm cancellation web page described above is presented to the recipient (1103) with the remaining process continuing as described above for a sender initiated cancellation. If the payment server determines that a recipient has requested that a selected gift certificate is to be retained (1105), the recipient is returned to the recipient's transaction detail web page (1102). Cancellation of a gift certificate is identical in effect whether initiated by a sender or a recipient.

The embodiments described above disclose a client-server processing system in which communications between the client and server occurs as a sequence of web pages provided by a web server that are rendered on the client computer as HTML documents processed within a web browser. One skilled in the art will recognize that a client-server distributed processing application that obtains the above described data needed to cancel a previously purchased a gift certificate may be obtained using a custom application running on the client computer where the data is communicated with the remote payment server and the remote commerce server using APIs that enable the transfer of the data between the computing systems. As such, the above embodiments are for illustrative purposes and other client-server application architectures may be used without departing from the spirit and scope of the present invention as recited within the attached claims.

Figure 12:
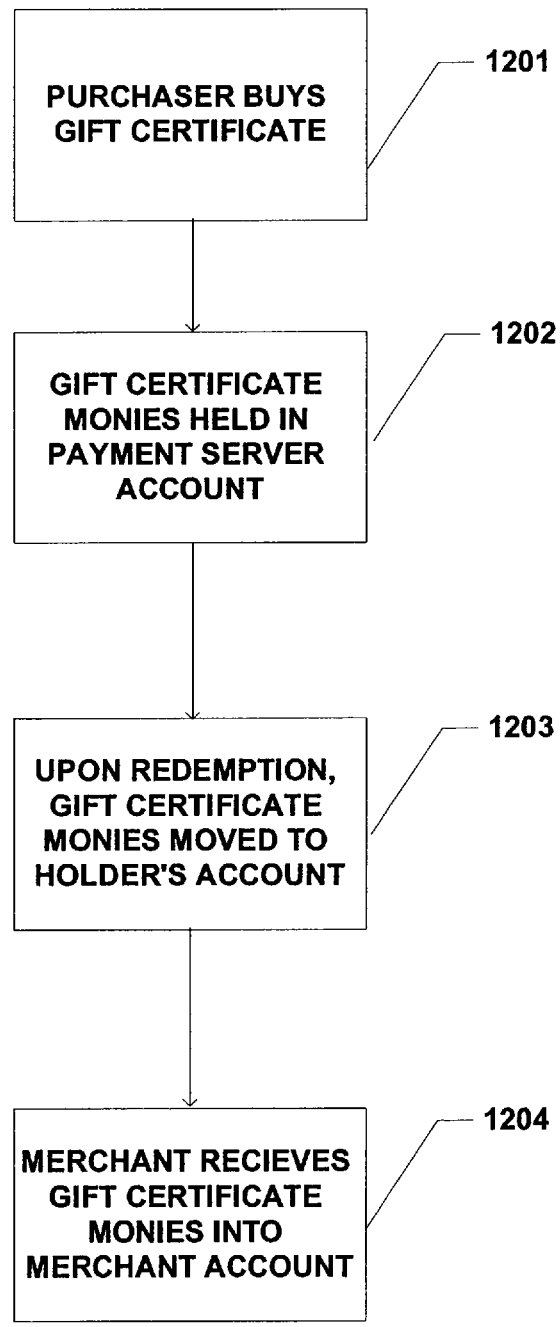
FIG. 12 is a flow diagram of transfer of monies within a payment server as part of redemption of an electronic gift certificate according to an exemplary embodiment of the present invention.

FIG. 12 is a flow diagram of transfer of monies within a payment server 143 as part of redemption of an electronic gift certificate, according to an exemplary embodiment of the present invention. In one exemplary embodiment, monies used for purchase of gift certificates that are subsequently used for purchase of goods from a commerce server are held with accounts associated with the payment server. When a purchaser buys a gift certificate, monies are provided from a funding source of the purchaser to the payment server (1201). Payment server 143 places and holds these monies in a payment server account associated with the commerce server that issued the gift certificates (1202). Merchants that use the commerce server to sell goods possess a payment service account that contains two separate balances: a balance of funds available for use and transfer to other accounts and a balance of funds corresponding to purchased and unredeemed gift certificates.

When a particular gift certificate is redeemed to complete a transaction associated with a merchant, funds associated with this gift certificate are transferred between the balance of funds corresponding to purchased and unredeemed gift certificates and balance of funds available for use and transfer to other accounts for that particular merchant (1203). This procedure ensures a purchaser of goods has funds available for use in redeeming the gift certificate at the time the gift certificate rather than provide it to the merchant when the gift certificate is sold. In addition, this procedure provides funds to be used for escheatment as required by applicable laws.

Once the funds have been transferred to the merchant's balance of usable funds, the merchant may transfer the funds to other accounts and otherwise use the funds as needed (1204). Since the merchant has now received these funds for completion of a transaction, the funds are properly considered the funds of the property of the merchant. This procedure also allows for any conversion of funds between currencies to occur at the time of the purchase of the goods, thus placing the effect of currency fluctuations upon the owner of the gift certificates as would be the case if the funds are held in any other account for later use.

Other issues related to money transfers in an exemplary embodiment may be included with a payment server 143. The payment server 143 may be configured such that there are no fees associated with the purchase of a gift certificate. The purchaser pays the face value of the gift certificate with no discount or premium. In addition, maintenance fees may be structured such that 12 months after the purchase or the last use of the gift certificate, a monthly maintenance fee may be imposed. This fee may be set up to be the smaller of $1.50 per month and the remaining balance of the gift certificate until the gift certificate balance is exhausted. Also, Standard Merchant Fees Upon Redemption may be set up such that when the gift certificate is redeemed, the merchant may pay the same fee that he or she would have had the recipient used any other funding source.

Funds from the purchase may be placed into a special non-fee account (e.g., Cat 99E), which may be controlled by a payment service. In one exemplary embodiment, the recipient is be able to use the gift certificate as a funding source only when purchasing a commerce platform auction item. The portion of the purchase funded by the gift certificate may come from a special non-fee account.

In one exemplary embodiment, all gift certificates are denominated in USD. When a holder purchases something in a different currency, then the funds are converted in the special non-fee account prior to funding the item. For example, if a holder purchases a €30 item using a $50 gift certificate, then $32 is converted to €30 in the Special non-fee account. €30 is moved from Special non-fee account to the holder's account temporarily, and then transferred to the merchant. The holder's gift certificate would still have an $18 balance held in the special non-fee account.

Escheatment laws exist in most states that require abandoned property to be given to the state. Normally, this would mean that funds held against unredeemed gift certificates be given to the state. By charging a maintenance fee that ultimately exhausts the gift certificate balance, the commerce platform/payment service is able to either use this to help offset the costs of fraud or return the gift certificate balance to the purchaser or sponsor.

Figure 13:
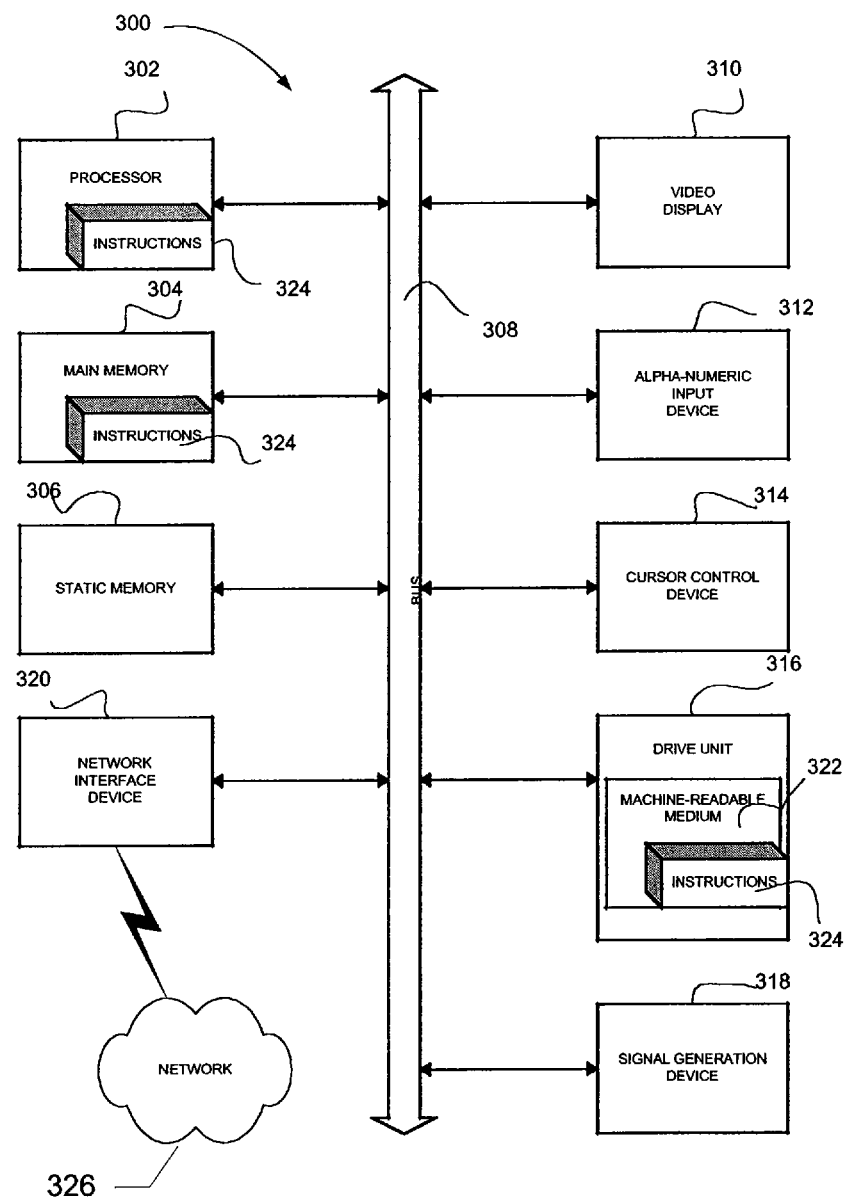
FIG. 13 is a block diagram illustrating a general programmable processing system for use in programmable processing system in accordance with various embodiments of the present invention.

FIG. 13 shows a diagrammatic representation of machine in the exemplary form of a computer system 300 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 300 includes a processor 302 (e.g., a central processing unit (CPU) a graphics processing unit (GPU) or both), a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alphanumeric input device 312 (e.g., a keyboard), a cursor control device 314 (e.g., a mouse), a disk drive unit 316, a signal generation device 318 (e.g., a speaker) and a network interface device 320.

The disk drive unit 316 includes a machine-readable medium 322 on which is stored one or more sets of instructions (e.g., software 324) embodying any one or more of the methodologies or functions described herein. The software 324 may also reside, completely or at least partially, within the main memory 304 and/or within the processor 302 during execution thereof by the computer system 300, the main memory 304 and the processor 302 also constituting machine-readable media. The software 324 may further be transmitted or received over a network 326 via the network interface device 320.

While the machine-readable medium 322 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Thus, a method and system to associate a gift certificate with an email address have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method of providing an interactive graphical user interface for use in performing a transaction across a communications network, comprising:

receiving, by a payment server, a record of a purchase transaction, the purchase transaction representing a purchase of an electronic gift certificate by a sender for a recipient;

storing, by the payment server, a record of the electronic gift certificate in a payment services account associated with the recipient, wherein the record of the electronic gift certificate is marked as an entry in a hidden state within the payment services account such that the record of the electronic gift certificate is not visible in a user interface representing the payment services account associated with the recipient;

identifying, by the payment server, a delivery date to deliver the electronic gift certificate to the recipient;

determining, by the payment server, whether a predetermined condition is met, the predetermined condition including a current date being the delivery date of the electronic gift certificate;

responsive to the predetermined condition being met, unmarking, by the payment server, the record of the electronic gift certificate as being in the hidden state within the payment services account such that a gift certificate button is visible in a payment confirmation page of the user interface, wherein the gift certificate button is associated with the payment services account and the electronic gift certificate and, and wherein the gift certificate button provides a mechanism for the recipient to redeem the electronic gift certificate using the payment services account;

receiving, by the payment server, a selection made on the payment confirmation page of the gift certificate button as a payment source; and responsive to the selection of the gift certificate button, redeeming, by the payment server, the electronic gift certificate and causing presentation of confirmation information within the payment confirmation page of the interactive graphical user interface.

2. The method of claim 1 further comprising:
based on the predetermined condition being met, sending an email message containing information on the electronic gift certificate associated with a communications identifier of the recipient to the communication identifier, the communications identifier associated with the payment services account associated with the recipient; and
verifying the recipient is authorized to use the electronic gift certificate.

3. The method of claim 2, wherein the verifying that the recipient is authorized to use the selected electronic gift certificate further comprises receiving confirmation data from the recipient as part of a confirmation when a hyperlink within an e-mail message is activated.

4. The method of claim 2, wherein the verifying the recipient is authorized to use the selected electronic gift certificate comprises successfully logging into the payment services account using the communications identifier of the recipient.

5. The method of claim 1, wherein the redeeming further includes:
receiving, at the interactive graphical user interface, a communications identifier associated with the electronic gift certificate; and
uniquely identifying the payment services account of the recipient, the recipient of the electronic gift certificate being authenticated as part of a log in process for logging into the payment services account of the recipient, to authorize redemption of the electronic gift certificate.

6. The method of claim 1, wherein the confirmation information comprises a hyperlink that when activated returns a unique confirmation code to the payment server.

7. The method of claim 1, wherein the confirmation information comprises a confirmation code.

8. The method of claim 1, wherein the confirmation information is contained within an e-mail message transmitted, to the recipient using a communications identifier, as part of redeeming the electronic gift certificate.

9. The method of claim 1, further comprising causing presentation of visual representation of all available payment sources that may be used to complete a transaction.

10. A system, comprising:
one or more computer-readable storage media having instructions stored thereon; and
one or more processors configured to, in response to execution of the instructions, cause the system to perform operations, the operations comprising:
receiving a record of a purchase transaction, the purchase transaction representing a purchase of an electronic gift certificate by a sender for a recipient of the electronic gift certificate;
storing a record of an electronic gift certificate within a payment server in a payment services account associated with the recipient, wherein the record of the electronic gift certificate is marked as an entry in a hidden state within the payment services account such that the record of the electronic gift certificate is not visible in a user interface representing the payment services account associated with the recipient;
identifying a delivery date to deliver the electronic gift certificate to the recipient;
determining whether a predetermined condition is met, the predetermined condition including a current date being the delivery date of the electronic gift certificate;
responsive to the predetermined condition being met, unmarking the record of the electronic gift certificate as being in the hidden state within the payment services account such that a gift certificate button is visible in a payment confirmation page of the user interface, wherein the gift certificate button is associated with the payment services account and the electronic gift certificate, and wherein the electronic gift certificate provides a mechanism for the recipient to redeem the electronic gift certificate using the payment services account;
receiving a selection made on the payment confirmation page of the gift certificate button as a payment source; and
responsive to the selection of the gift certificate button, redeeming the electronic gift certificate and causing presentation of confirmation information within the payment confirmation page of an interactive graphical user interface.

11. The system of claim 10, wherein the redeeming further includes:
based on the predetermined condition being met, sending an email message containing information on the electronic gift certificate associated with a communications identifier of the recipient to the communication identifier, the communications identifier associated with the payment services account associated with the recipient; and
verifying the recipient is authorized to use the electronic gift certificate.

12. The system of claim 11, wherein the verifying that the recipient is authorized to use the selected electronic gift certificate further comprises receiving confirmation data from the recipient as part of a confirmation when a hyperlink within an e-mail message is activated.

13. The system of claim 11, wherein the verifying the recipient is authorized to use the selected electronic gift certificate comprises successfully logging into the payment services account using the communications identifier of the recipient.

14. The system of claim 10, wherein the redeeming further includes:
receiving, at the user interface, a communications identifier associated with the electronic gift certificate and uniquely identifying the payment services account of the recipient, the recipient of the electronic gift certificate being authenticated as part of a log in process for logging into the payment services account of the recipient, to authorize redemption of the electronic gift certificate.

15. A non-transitory machine-readable storage medium comprising processor executable instructions that, in response to being executed by a processor of a machine, cause the machine to perform operations comprising:
receiving, by a payment server, a record of a purchase transaction, the purchase transaction representing a purchase of an electronic gift certificate by a sender for a recipient;
storing on a user device of the recipient, a record of the electronic gift certificate in a payment services account associated with the recipient, wherein the record of the electronic gift certificate is marked as an entry in a hidden state within the payment services account such that the record of the electronic gift certificate is not visible in a user interface representing the payment services account associated with the recipient;

identifying, by the payment server, a delivery date to deliver the electronic gift certificate to the recipient;

determining, by the payment server, whether a predetermined condition is met, the predetermined condition including a current date being the delivery date of the electronic gift certificate;

responsive to the predetermined condition being met, unmarking, by the payment server, the record of the electronic gift certificate as being in the hidden state within the payment services account such that a gift certificate button is visible in a payment confirmation page of the user interface, wherein the gift certificate button being associated with the payment services account and the electronic gift certificate, and wherein the gift certificate button provides a mechanism for the recipient to redeem the electronic gift certificate using the payment services account;

receiving, by the payment server, on the payment confirmation page of the user interface, a selection made on the payment confirmation page of the gift certificate button as a payment source; and responsive to the selection of the gift certificate button, redeeming, by the payment server, the electronic gift certificate in the payment server and causing presentation of confirmation information within the payment confirmation page of an interactive graphical user interface.

16. The non-transitory machine-readable storage medium of claim 15, wherein the redeeming further includes:

receiving, at the user interface, a communications identifier associated with the electronic gift certificate and uniquely identifying the payment services account of the recipient, the recipient of the electronic gift certificate being authenticated as part of a log in process for logging into the payment services account of the recipient, to authorize redemption of the electronic gift certificate.

* * * * *